US007964832B2

(12) United States Patent
Hasebe

(10) Patent No.: US 7,964,832 B2
(45) Date of Patent: Jun. 21, 2011

(54) EVALUATION DEVICE OF OPTICAL WRITING DEVICE AND EVALUATION METHOD THEREOF

(75) Inventor: Takashi Hasebe, Sagamihara (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 100 days.

(21) Appl. No.: 12/552,538

(22) Filed: Sep. 2, 2009

(65) Prior Publication Data

US 2010/0051781 A1 Mar. 4, 2010

(30) Foreign Application Priority Data

Sep. 4, 2008 (JP) ................................ 2008-226919

(51) Int. Cl.
*G01J 1/20* (2006.01)
*B41J 2/435* (2006.01)
*G02B 26/88* (2006.01)
*G03G 15/08* (2006.01)

(52) U.S. Cl. ............... 250/201.1; 359/205.1; 359/204.1; 347/236; 347/246; 399/53; 399/66; 399/74

(58) Field of Classification Search ............... 359/204.1, 359/205.1; 399/49, 53, 66, 74, 167, 313; 347/236, 246; 250/201.1
See application file for complete search history.

(56) References Cited

U.S. PATENT DOCUMENTS

| | | | | |
|---|---|---|---|---|
| 6,070,041 | A * | 5/2000 | Nakayasu et al. | 399/301 |
| 6,084,657 | A * | 7/2000 | Masuda et al. | 355/71 |
| 7,411,712 | B2 * | 8/2008 | Nakajima et al. | 359/204.1 |
| 7,450,138 | B2 * | 11/2008 | Takeyama et al. | 347/116 |
| 7,728,863 | B2 * | 6/2010 | Miyatake et al. | 347/244 |
| 7,733,362 | B2 * | 6/2010 | Kanzaki et al. | 347/236 |
| 7,826,116 | B2 * | 11/2010 | Itabashi | 359/205.1 |

FOREIGN PATENT DOCUMENTS

JP 2006-248185 A 9/2006

* cited by examiner

*Primary Examiner* — Sang Nguyen
(74) *Attorney, Agent, or Firm* — Holtz, Holtz, Goodman & Chick, PC

(57) ABSTRACT

Disclosed is an evaluation device of an optical writing device, comprising: the optical writing device; a light reception section; a drive section; and a control section to light each light emitting element in a previously set lighting pattern based on a light amount; to drive the drive section to move the light reception section to a position opposite to the light emitting element to be lit; to calculate characteristic data based on a light amount value of the light received by the light reception section; to calculate a first calculation value based on the characteristic data for each light emitting element; to calculate a second calculation value different from the first calculation value based on the characteristic data; to calculate a third calculation value based on the first calculation value and the second calculation value; and to instruct the display section to display the third calculation value.

18 Claims, 21 Drawing Sheets

FIG.15

| | | SAMPLE NUMBER | | | | |
|---|---|---|---|---|---|---|
| | | 10 | 11 | 26 | 37 | 47 |
| ELEMENT SEGMENT NUMBER | 1 | ○ | ○ | ○ | ○ | ○ |
| | 2 | ○ | ○ | ○ | ○ | ○ |
| | 3 | ○ | ○ | ○ | ○ | ○ |
| | 4 | ○ | ○ | ○ | ○ | ○ |
| | 5 | ○ | ○ | ○ | ○ | ○ |
| | 6 | ○ | ○ | ○ | ○ | ○ |
| | 7 | ○ | ○ | ○ | ○ | ○ |
| | 8 | ○ | ○ | ○ | ○ | ○ |
| | 9 | ○ | ○ | ○ | ○ | ○ |
| | 10 | ○ | ○ | ○ | ○ | ○ |
| | 11 | ○ | ○ | ○ | ○ | ○ |
| | 12 | ○ | ○ | ○ | ○ | ○ |
| | 13 | ○ | ○ | ○ | ○ | ○ |
| | 14 | ○ | ○ | ○ | ○ | ○ |
| | 15 | ○ | ○ | ○ | ○ | ○ |
| | 16 | ○ | ○ | × | × | ○ |
| | 17 | ○ | ○ | ○ | ○ | ○ |
| | 18 | ○ | ○ | ○ | ○ | ○ |
| | 19 | ○ | ○ | ○ | ○ | ○ |
| | 20 | ○ | ○ | ○ | ○ | ○ |
| | 21 | ○ | ○ | ○ | ○ | ○ |
| | 22 | ○ | ○ | ○ | ○ | ○ |
| | 23 | ○ | ○ | ○ | ○ | ○ |
| | 24 | ○ | ○ | ○ | ○ | ○ |
| | 25 | ○ | ○ | ○ | ○ | ○ |
| | 26 | ○ | ○ | ○ | ○ | ○ |
| | 27 | ○ | ○ | ○ | ○ | ○ |
| | 28 | ○ | ○ | ○ | ○ | ○ |
| | 29 | ○ | ○ | ○ | ○ | ○ |
| | 30 | ○ | ○ | ○ | ○ | ○ |
| | 31 | ○ | ○ | ○ | ○ | ○ |
| | 32 | ○ | ○ | ○ | ○ | ○ |
| | 33 | ○ | ○ | ○ | ○ | ○ |
| | 34 | ○ | ○ | ○ | ○ | ○ |
| | 35 | ○ | ○ | ○ | ○ | ○ |
| | 36 | × | ○ | ○ | ○ | × |
| | 37 | ○ | ○ | ○ | ○ | ○ |
| | 38 | ○ | × | ○ | ○ | ○ |
| | 39 | ○ | ○ | ○ | ○ | ○ |
| | 40 | ○ | ○ | ○ | ○ | ○ |

FIG.16

| ELEMENT SEGMENT NUMBER | SAMPLE NUMBER 10 | 11 | 26 | 37 | 47 |
|---|---|---|---|---|---|
| 1 | 2.39 | 0.84 | 0.66 | 0.97 | 0.63 |
| 2 | 1.64 | 0.53 | 0.50 | 1.48 | 0.65 |
| 3 | 1.17 | 0.49 | 0.24 | 0.21 | 0.87 |
| 4 | 0.92 | 0.34 | 0.59 | 1.43 | 0.89 |
| 5 | 0.48 | 0.43 | 0.95 | 0.56 | 1.07 |
| 6 | 0.97 | 0.37 | 0.47 | 0.54 | 0.72 |
| 7 | 0.41 | 0.46 | 0.81 | 0.74 | 0.78 |
| 8 | 0.34 | 0.60 | 0.21 | 0.63 | 0.78 |
| 9 | 0.36 | 0.40 | 0.60 | 0.36 | 0.63 |
| 10 | 0.99 | 0.37 | 0.43 | 0.88 | 0.25 |
| 11 | 0.19 | 0.42 | 0.52 | 0.54 | 1.91 |
| 12 | 0.96 | 0.56 | 0.94 | 0.92 | 0.44 |
| 13 | 0.49 | 0.49 | 0.54 | 0.36 | 0.79 |
| 14 | 1.02 | 0.72 | 0.63 | 1.14 | 0.72 |
| 15 | 0.61 | 0.39 | 0.46 | 0.71 | 0.20 |
| 16 | 0.47 | 0.51 | 3.98 | 2.09 | 0.62 |
| 17 | 0.72 | 0.50 | 0.59 | 1.78 | 1.18 |
| 18 | 0.68 | 0.46 | 0.55 | 0.87 | 0.56 |
| 19 | 1.01 | 0.61 | 0.39 | 0.09 | 0.72 |
| 20 | 0.70 | 0.67 | 0.70 | 1.16 | 1.68 |
| 21 | 1.55 | 0.33 | 0.92 | 0.54 | 0.10 |
| 22 | 0.61 | 0.38 | 0.70 | 0.71 | 1.42 |
| 23 | 1.02 | 0.36 | 0.73 | 0.48 | 1.03 |
| 24 | 1.32 | 0.46 | 0.29 | 1.51 | 0.81 |
| 25 | 0.59 | 0.56 | 0.83 | 0.39 | 0.52 |
| 26 | 0.61 | 0.30 | 0.40 | 0.64 | 0.56 |
| 27 | 1.85 | 0.58 | 0.58 | 0.52 | 0.80 |
| 28 | 1.68 | 0.55 | 1.25 | 0.58 | 0.80 |
| 29 | 0.36 | 0.47 | 0.71 | 0.75 | 0.28 |
| 30 | 1.22 | 0.49 | 0.41 | 0.28 | 0.63 |
| 31 | 0.66 | 0.32 | 0.43 | 0.58 | 0.38 |
| 32 | 0.53 | 0.41 | 0.40 | 0.65 | 0.56 |
| 33 | 0.44 | 0.43 | 0.70 | 0.70 | 0.76 |
| 34 | 0.35 | 1.02 | 0.47 | 0.64 | 0.24 |
| 35 | 0.61 | 0.97 | 1.14 | 0.55 | 1.08 |
| 36 | 3.97 | 0.31 | 0.51 | 0.96 | 2.45 |
| 37 | 0.35 | 0.49 | 0.61 | 0.89 | 1.14 |
| 38 | 0.74 | 3.00 | 0.48 | 0.15 | 0.09 |
| 39 | 1.79 | 1.13 | 0.35 | 1.29 | 2.35 |
| 40 | 0.57 | 0.78 | 0.52 | 0.90 | 1.89 |

FIG.17

| ELEMENT SEGMENT NUMBER | SAMPLE NUMBER 10 | 11 | 26 | 37 | 47 |
|---|---|---|---|---|---|
| 1 | 1.97 | 0.54 | 0.57 | 0.91 | 0.60 |
| 2 | 1.47 | 0.54 | 0.40 | 1.39 | 0.41 |
| 3 | 1.07 | 0.30 | 0.19 | 0.09 | 0.69 |
| 4 | 0.69 | 0.15 | 0.38 | 0.99 | 0.83 |
| 5 | 0.38 | 0.30 | 0.58 | 0.54 | 0.93 |
| 6 | 0.77 | 0.33 | 0.26 | 0.49 | 0.30 |
| 7 | 0.22 | 0.39 | 0.81 | 0.50 | 0.52 |
| 8 | 0.29 | 0.44 | 0.17 | 0.49 | 0.68 |
| 9 | 0.34 | 0.39 | 0.56 | 0.29 | 0.42 |
| 10 | 0.75 | 0.35 | 0.27 | 0.69 | 0.09 |
| 11 | 0.28 | 0.35 | 0.47 | 0.50 | 1.48 |
| 12 | 0.74 | 0.40 | 0.78 | 0.81 | 0.13 |
| 13 | 0.37 | 0.43 | 0.40 | 0.26 | 0.75 |
| 14 | 0.80 | 0.50 | 0.44 | 0.86 | 0.62 |
| 15 | 0.55 | 0.38 | 0.67 | 0.70 | 0.19 |
| 16 | 0.34 | 0.40 | 3.29 | 2.01 | 0.52 |
| 17 | 0.58 | 0.36 | 0.55 | 1.72 | 0.97 |
| 18 | 0.61 | 0.35 | 0.40 | 0.85 | 0.45 |
| 19 | 0.83 | 0.57 | 0.36 | 0.01 | 0.62 |
| 20 | 0.61 | 0.43 | 0.46 | 0.95 | 1.67 |
| 21 | 1.16 | 0.21 | 0.72 | 0.48 | -0.01 |
| 22 | 0.65 | 0.41 | 0.66 | 0.58 | 1.17 |
| 23 | 0.62 | 0.32 | 0.64 | 0.34 | 0.99 |
| 24 | 0.84 | 0.24 | 0.25 | 1.29 | 0.67 |
| 25 | 0.61 | 0.33 | 0.69 | 0.34 | 0.42 |
| 26 | 0.46 | 0.21 | 0.30 | 0.49 | 0.37 |
| 27 | 1.48 | 0.39 | 0.42 | 0.41 | 0.68 |
| 28 | 1.21 | 0.38 | 1.19 | 0.44 | 0.61 |
| 29 | 0.22 | 0.46 | 0.74 | 0.68 | 0.22 |
| 30 | 1.00 | 0.32 | 0.26 | 0.24 | 0.49 |
| 31 | 0.55 | 0.27 | 0.33 | 0.57 | 0.25 |
| 32 | 0.63 | 0.30 | 0.34 | 0.65 | 0.37 |
| 33 | 0.42 | 0.23 | 0.47 | 0.66 | 0.61 |
| 34 | 0.30 | 1.00 | 0.29 | 0.47 | 0.16 |
| 35 | 0.51 | 0.93 | 0.73 | 0.41 | 1.07 |
| 36 | 3.52 | 0.18 | 0.38 | 0.90 | 2.25 |
| 37 | 0.20 | 0.52 | 0.55 | 0.80 | 1.01 |
| 38 | 0.43 | 2.70 | 0.35 | 0.05 | 0.08 |
| 39 | 1.75 | 0.94 | 0.23 | 1.23 | 2.20 |
| 40 | 0.40 | 0.53 | 0.44 | 0.84 | 1.85 |

FIG.18

| ELEMENT SEGMENT NUMBER | SAMPLE NUMBER 10 | 11 | 26 | 37 | 47 |
|---|---|---|---|---|---|
| 1 | 1.84 | 0.34 | 0.42 | 0.65 | 0.52 |
| 2 | 1.15 | 0.43 | 0.39 | 1.30 | 0.24 |
| 3 | 0.91 | 0.26 | 0.06 | -0.03 | 0.48 |
| 4 | 0.38 | 0.06 | 0.20 | 0.73 | 0.68 |
| 5 | 0.31 | 0.35 | 0.37 | 0.48 | 0.85 |
| 6 | 0.70 | 0.23 | 0.21 | 0.43 | 0.19 |
| 7 | 0.28 | 0.31 | 0.68 | 0.29 | 0.38 |
| 8 | 0.17 | 0.37 | 0.14 | 0.54 | 0.39 |
| 9 | 0.28 | 0.38 | 0.41 | 0.24 | 0.36 |
| 10 | 0.54 | 0.25 | 0.25 | 0.50 | 0.09 |
| 11 | 0.34 | 0.27 | 0.41 | 0.32 | 1.06 |
| 12 | 0.61 | 0.39 | 0.68 | 0.64 | 0.11 |
| 13 | 0.33 | 0.34 | 0.36 | 0.31 | 0.72 |
| 14 | 0.61 | 0.39 | 0.36 | 0.79 | 0.55 |
| 15 | 0.43 | 0.29 | 0.93 | 0.56 | 0.14 |
| 16 | 0.27 | 0.26 | 2.43 | 1.68 | 0.50 |
| 17 | 0.59 | 0.21 | 0.44 | 1.59 | 0.88 |
| 18 | 0.66 | 0.32 | 0.26 | 0.69 | 0.41 |
| 19 | 0.73 | 0.40 | 0.38 | -0.05 | 0.68 |
| 20 | 0.41 | 0.33 | 0.34 | 0.77 | 1.34 |
| 21 | 1.09 | 0.22 | 0.83 | 0.31 | -0.08 |
| 22 | 0.57 | 0.33 | 0.63 | 0.50 | 0.98 |
| 23 | 0.61 | 0.27 | 0.54 | 0.32 | 0.91 |
| 24 | 0.61 | 0.20 | 0.19 | 1.07 | 0.59 |
| 25 | 0.63 | 0.33 | 0.60 | 0.21 | 0.37 |
| 26 | 0.39 | 0.25 | 0.25 | 0.55 | 0.30 |
| 27 | 0.98 | 0.31 | 0.41 | 0.33 | 0.60 |
| 28 | 1.05 | 0.29 | 1.06 | 0.43 | 0.58 |
| 29 | 0.40 | 0.33 | 0.69 | 0.42 | 0.16 |
| 30 | 0.71 | 0.23 | 0.18 | 0.22 | 0.35 |
| 31 | 0.54 | 0.19 | 0.25 | 0.42 | 0.24 |
| 32 | 0.54 | 0.18 | 0.34 | 0.62 | 0.27 |
| 33 | 0.37 | 0.22 | 0.28 | 0.57 | 0.37 |
| 34 | 0.24 | 0.83 | 0.18 | 0.42 | 0.10 |
| 35 | 0.42 | 0.82 | 0.46 | 0.36 | 0.85 |
| 36 | 3.14 | 0.10 | 0.36 | 0.79 | 1.90 |
| 37 | 0.20 | 0.55 | 0.41 | 0.58 | 0.84 |
| 38 | 0.31 | 2.27 | 0.33 | -0.09 | 0.02 |
| 39 | 1.22 | 0.88 | 0.15 | 1.06 | 2.11 |
| 40 | 0.33 | 0.37 | 0.44 | 0.85 | 1.80 |

FIG. 19

| ELEMENT SEGMENT NUMBER | SAMPLE NUMBER 10 | 11 | 26 | 37 | 47 |
|---|---|---|---|---|---|
| 1 | 2.06 | 0.95 | 0.55 | 0.65 | 0.77 |
| 2 | 1.43 | 0.49 | 0.47 | 1.18 | 0.71 |
| 3 | 0.89 | 0.42 | 0.36 | 0.36 | 0.89 |
| 4 | 0.90 | 0.32 | 0.56 | 1.28 | 0.73 |
| 5 | 0.47 | 0.41 | 0.91 | 0.53 | 0.97 |
| 6 | 0.87 | 0.25 | 0.56 | 0.52 | 0.92 |
| 7 | 0.36 | 0.31 | 0.58 | 0.63 | 0.74 |
| 8 | 0.38 | 0.59 | 0.32 | 0.54 | 0.79 |
| 9 | 0.50 | 0.40 | 0.63 | 0.47 | 0.62 |
| 10 | 0.78 | 0.44 | 0.44 | 0.92 | 0.49 |
| 11 | 0.20 | 0.43 | 0.59 | 0.53 | 1.83 |
| 12 | 0.95 | 0.54 | 0.93 | 0.85 | 0.64 |
| 13 | 0.56 | 0.44 | 0.45 | 0.59 | 0.72 |
| 14 | 0.99 | 0.77 | 0.67 | 1.12 | 0.65 |
| 15 | 0.52 | 0.39 | 0.43 | 0.65 | 0.27 |
| 16 | 0.57 | 0.50 | 3.60 | 1.83 | 0.71 |
| 17 | 0.54 | 0.49 | 0.49 | 1.46 | 1.09 |
| 18 | 0.66 | 0.39 | 0.65 | 0.78 | 0.56 |
| 19 | 0.98 | 0.68 | 0.37 | 0.40 | 0.73 |
| 20 | 0.92 | 0.73 | 0.72 | 1.02 | 1.39 |
| 21 | 1.35 | 0.38 | 0.88 | 0.65 | 0.32 |
| 22 | 0.70 | 0.32 | 0.59 | 0.65 | 1.04 |
| 23 | 0.97 | 0.38 | 0.75 | 0.39 | 0.96 |
| 24 | 1.27 | 0.55 | 0.34 | 1.30 | 0.76 |
| 25 | 0.54 | 0.49 | 0.60 | 0.30 | 0.58 |
| 26 | 0.64 | 0.29 | 0.46 | 0.62 | 0.55 |
| 27 | 1.72 | 0.57 | 0.68 | 0.66 | 0.79 |
| 28 | 1.54 | 0.52 | 0.95 | 0.66 | 0.69 |
| 29 | 0.37 | 0.45 | 0.50 | 0.72 | 0.44 |
| 30 | 1.12 | 0.57 | 0.40 | 0.32 | 0.56 |
| 31 | 0.59 | 0.42 | 0.48 | 0.59 | 0.37 |
| 32 | 0.55 | 0.44 | 0.45 | 0.57 | 0.62 |
| 33 | 0.49 | 0.39 | 0.84 | 0.63 | 0.88 |
| 34 | 0.36 | 0.80 | 0.54 | 0.61 | 0.39 |
| 35 | 0.73 | 0.76 | 1.15 | 0.42 | 1.03 |
| 36 | 3.25 | 0.33 | 0.46 | 0.81 | 2.25 |
| 37 | 0.54 | 0.48 | 0.52 | 0.71 | 1.24 |
| 38 | 0.89 | 2.58 | 0.48 | 0.39 | 0.46 |
| 39 | 1.48 | 0.83 | 0.41 | 1.23 | 1.71 |
| 40 | 0.92 | 0.63 | 0.56 | 0.64 | 1.15 |

FIG.20

| | | | | | | |
|---|---|---|---|---|---|---|
| | | 10 | 11 | 26 | 37 | 47 |
| ELEMENT SEGMENT NUMBER | 1 | 1.63 | 0.63 | 0.49 | 0.59 | 0.68 |
| | 2 | 1.23 | 0.48 | 0.22 | 1.05 | 0.58 |
| | 3 | 0.82 | 0.29 | 0.26 | 0.23 | 0.69 |
| | 4 | 0.71 | 0.24 | 0.36 | 0.81 | 0.67 |
| | 5 | 0.36 | 0.26 | 0.55 | 0.51 | 0.85 |
| | 6 | 0.66 | 0.17 | 0.35 | 0.37 | 0.52 |
| | 7 | 0.36 | 0.23 | 0.57 | 0.47 | 0.51 |
| | 8 | 0.32 | 0.42 | 0.28 | 0.36 | 0.70 |
| | 9 | 0.40 | 0.38 | 0.60 | 0.40 | 0.46 |
| | 10 | 0.55 | 0.33 | 0.30 | 0.74 | 0.34 |
| | 11 | 0.19 | 0.35 | 0.54 | 0.51 | 1.39 |
| | 12 | 0.73 | 0.39 | 0.81 | 0.75 | 0.35 |
| | 13 | 0.45 | 0.41 | 0.29 | 0.44 | 0.69 |
| | 14 | 0.79 | 0.57 | 0.48 | 0.81 | 0.54 |
| | 15 | 0.50 | 0.39 | 0.34 | 0.63 | 0.21 |
| | 16 | 0.46 | 0.39 | 2.91 | 1.75 | 0.57 |
| | 17 | 0.42 | 0.35 | 0.41 | 1.41 | 0.88 |
| | 18 | 0.65 | 0.34 | 0.49 | 0.80 | 0.47 |
| | 19 | 0.76 | 0.63 | 0.34 | 0.34 | 0.58 |
| | 20 | 0.81 | 0.51 | 0.47 | 0.81 | 1.38 |
| | 21 | 0.97 | 0.25 | 0.63 | 0.55 | 0.21 |
| | 22 | 0.73 | 0.36 | 0.56 | 0.54 | 0.77 |
| | 23 | 0.59 | 0.30 | 0.66 | 0.38 | 0.91 |
| | 24 | 0.82 | 0.34 | 0.20 | 1.07 | 0.62 |
| | 25 | 0.55 | 0.31 | 0.46 | 0.27 | 0.48 |
| | 26 | 0.46 | 0.25 | 0.35 | 0.37 | 0.28 |
| | 27 | 1.34 | 0.28 | 0.50 | 0.61 | 0.72 |
| | 28 | 1.06 | 0.42 | 0.91 | 0.46 | 0.51 |
| | 29 | 0.32 | 0.44 | 0.35 | 0.64 | 0.32 |
| | 30 | 0.84 | 0.39 | 0.25 | 0.19 | 0.45 |
| | 31 | 0.45 | 0.38 | 0.37 | 0.54 | 0.23 |
| | 32 | 0.58 | 0.30 | 0.39 | 0.57 | 0.43 |
| | 33 | 0.48 | 0.26 | 0.64 | 0.58 | 0.73 |
| | 34 | 0.31 | 0.80 | 0.38 | 0.47 | 0.36 |
| | 35 | 0.76 | 0.72 | 0.75 | 0.28 | 0.97 |
| | 36 | 2.80 | 0.23 | 0.32 | 0.72 | 2.04 |
| | 37 | 0.51 | 0.43 | 0.46 | 0.58 | 1.08 |
| | 38 | 0.54 | 2.27 | 0.42 | 0.27 | 0.38 |
| | 39 | 1.44 | 0.69 | 0.29 | 1.12 | 1.52 |
| | 40 | 0.75 | 0.42 | 0.45 | 0.57 | 1.10 |

EVALUATION DEVICE OF OPTICAL WRITING DEVICE AND EVALUATION METHOD THEREOF

BACKGROUND OF THE INVENTION

1. Field of the Invention

The present invention relates to an evaluation device of an optical writing device and an evaluation method of the optical writing device.

2. Description of Related Art

In recent years, an image forming apparatus has been developed in which an LED print head (hereinbelow referred to as an LPH), as an optical writing device to form an electrostatic latent image on a surface of a photo conductor. The LPH comprises an LED chip array, and a lens array. The LED chip array is configured in a state where an LED chip comprising a plurality of LED (Light Emitting Diode) elements are arranged along the main scanning direction according to a previously set resolution on an array. The lens array is configured in a state where a plurality of GRIN (Graded-Index) lenses are arranged to collect irradiation light from LED elements which emit light according to image data, so that an electrostatic latent image is formed with an image on a photo conductor.

It is known that light amount unevenness is generated while the light writing processing using the LPH because of the manufacturing variability of the LED elements; the variability in optical characteristics caused by the mounting position, the change of angles, the refractive index distribution, and the like, of the GRIN lens; the attachment of dust, and the like. In an image forming apparatus using such LPH, density unevenness is generated at places where the light amount unevenness has been generated, therefore there is a problem that noise lines such as white noise lines, black noise lines, and the like, are generated because of the density unevenness. These noise lines are generated in an image as shadows in a form of lines by the density unevenness, thus may also be referred to as shadow noise lines.

Japanese Patent Application Laid-open Publication No. 2006-248185 discloses an optical writing device to previously specify the position of the noise lines caused by the head or the lens array so as to correct only the noise lines. In this optical writing device, places in need of correction where the linearity of the image density with respect to the light amount variation of the image data input to the light exposing head is lost is specified by the MTF (Modulation Transfer Function) of the lens array or the MTF of the light exposing head, thereby the specified places in need of correction is subjected to the correction of the density variability.

However, in the technique disclosed in the Japanese Patent Application Laid-open Publication No. 2006-248185, when the places in need of correction is to be specified, the defocusing position is changed by 5 levels to observe the variation of the MTF at each dot position, thereby the places where the MTF drastically changes is specified, on the graph in which the horizontal axis represents the dot position and the vertical axis represents the MTF. Thus, in the technique disclosed in the Japanese Patent Application Laid-open Publication No. 2006-248185, places in need of density correction are specified according to the MTF characteristics at a plurality of different defocusing positions, and there is a possibility that the specified places in need of correction may be different from the generation position of the noise lines which is supposed to be generated at a position where the image is formed. Further, in the technique disclosed in the Japanese Patent Application Laid-open Publication No. 2006-248185, the places in need of correction are specified in the image forming apparatus which comprises the LPH, thus when there is a serious image quality issue, there is a possibility that the issue cannot be handled only by the correction processing performed in the image forming apparatus

SUMMARY OF THE INVENTION

The present invention is made in view of the above described circumstances, and one of the objects thereof is to be capable of previously specifying the places in need of correction of the light emitting elements comprised by an optical writing device, corresponding to the generation position of the noise lines, to be capable of judging whether an image quality issue is to be generated or not, and to obtain an opportunity to take measures according to the issue, before incorporating the optical writing device into the an image forming apparatus, thereby to improve the image quality.

To achieve the above object, an evaluation device of an optical writing device reflecting one aspect of the present invention, comprises:

the optical writing device having:

a light source section comprising a plurality of light emitting elements arranged in a main scanning direction; and an optical section comprising a plurality of imaging lenses to collect an irradiation light from the light emitting elements so as to form an image on an exposure side;

a light reception section to receive the light irradiated from the optical writing device;

a drive section to retain the light reception section at a position opposite to an irradiation side of the optical writing device, and to move the light reception section in the main scanning direction; and a control section to light each light emitting element of the optical writing device in a previously set lighting pattern based on a light amount which is previously set; to drive the drive section so as to move the light reception section to a position opposite to the light emitting element to be lit; to calculate characteristic data for each light emitting element based on a light amount value of the light received by the light reception section; to calculate a first calculation value for each light emitting element based on the characteristic data for each light emitting element; to calculate a second calculation value different from the first calculation value for each light emitting element based on the characteristic data for each light emitting element; to calculate a third calculation value based on the first calculation value and the second calculation value for each light emitting element; and to instruct the display section to display the third calculation value.

Further, an evaluation method of an optical writing device having: a light source section comprising a plurality of light emitting elements arranged in a main scanning direction; and an optical section comprising a plurality of imaging lenses to collect an irradiation light from the light emitting elements so as to form an image on an exposure side, reflecting another aspect of the present invention, comprises:

lighting each light emitting element in a previously set lighting pattern based on a light amount previously set by a control section, and moving a light reception section to a position opposite to the light emitting element to be lit;

calculating of characteristic data to calculate the characteristic data for each light emitting element based on a light amount value of a light received by the light reception section;

first calculating to calculate a first calculation value for each light emitting element based on the characteristic data for each light emitting element by the control section;

second calculating to calculate a second calculation value different from the first calculation value for each light emitting element based on the characteristic data for each light emitting element by the control section;

third calculating to calculate a third calculation value based on the first calculation value and the second calculation value for each light emitting element by the control section; and specifying of a correction target to display the third calculation value in a display section by the control section.

BRIEF DESCRIPTION OF THE DRAWINGS

These and other objects, advantages and features of the present invention will become more fully understood from the detailed description given hereinbelow and the appended drawings, and thus are not intended as a definition of the limits of the present invention, and wherein:

FIG. 15 is a diagram showing a table of an image validation result of the LPH where noise lines are observed;

FIG. 16 is a diagram showing a table of difference value validation results of the LPH;

FIG. 17 is a diagram showing a table of difference value validation results of the LPH;

FIG. 18 is a diagram showing a table of difference value validation results of the LPH;

FIG. 19 is a diagram showing a table of difference value validation results of the LPH;

FIG. 20 is a diagram showing a table of difference value validation results of the LPH.

DETAILED DESCRIPTION OF THE PREFERRED EMBODIMENT

Hereinbelow, an embodiment of the present invention is described in detail with reference to the drawings.

First, the configuration is explained.

Figure 1:
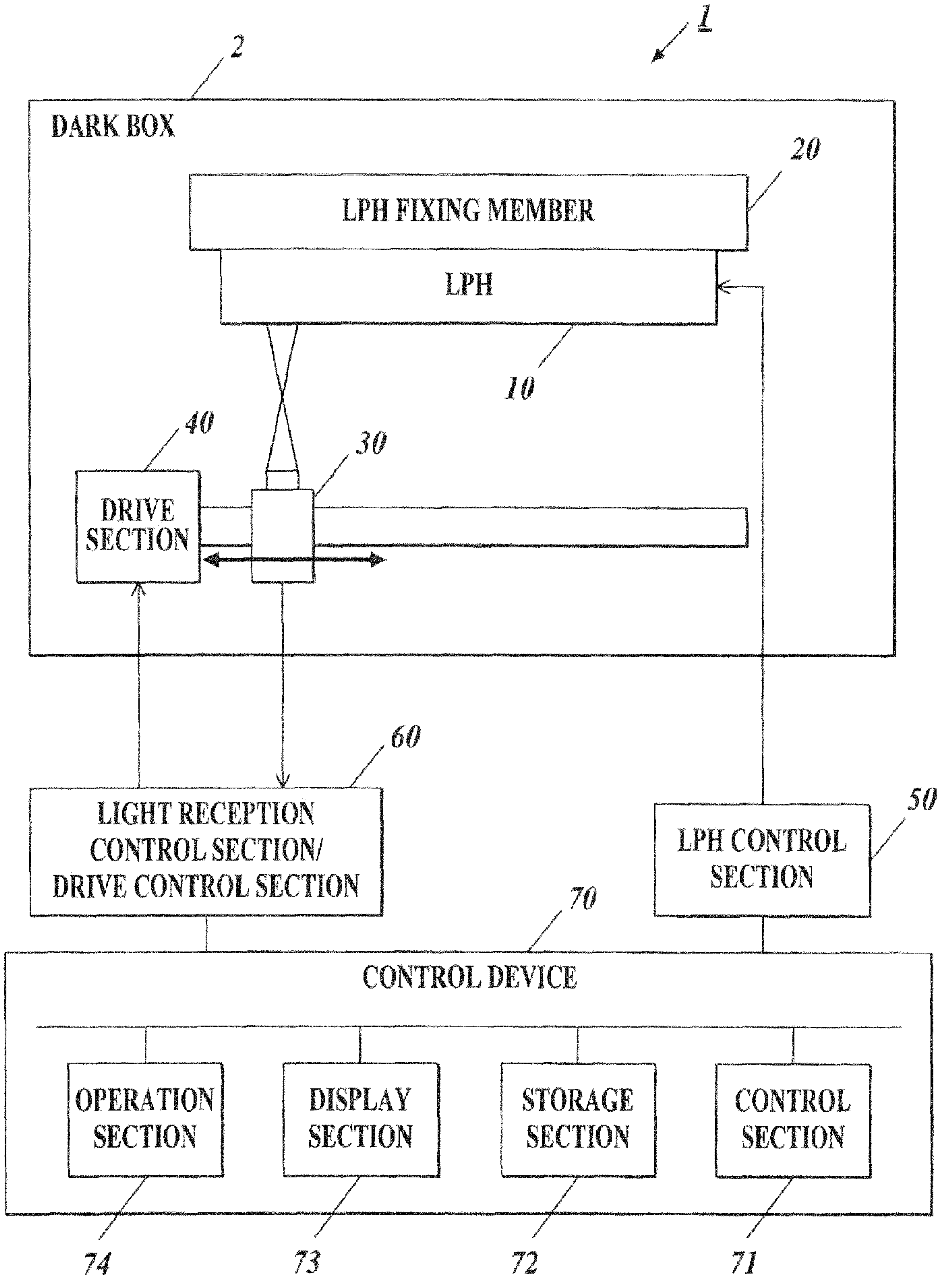
FIG. 1 is a diagram showing a configuration of an LPH evaluation device.

FIG. 1 shows the configuration diagram of an LPH evaluation device 1 according to the present embodiment.

As shown in FIG. 1, the LPH evaluation device 1 comprises: an LPH 10; an LPH fixing member 20; a light reception section 30; a drive section 40 which are provided in a dark box 2; an LPH control section 50; a light reception control section/drive control section 60; and a control device 70.

The LPH 10 comprises a light source section and an optical section. The light source section comprises an LED (Light Emitting Diode) array which is configured by a plurality of light emitting elements (for example, LED elements) arranged in a main scanning direction by a pixel pitch corresponding to a previously set resolution. The optical section comprises a lens array configured by a plurality of imaging lenses (for example, GRIN (Graded-Index) lens) to collect irradiation light from the light emitting elements so that an image is formed on an exposure side. The LPH 10 is an optical writing device in which the light emitting elements are selectively driven based on image data to be lit, and light irradiated from the driven light emitting elements is collected on the exposure side by the imaging lenses so that an image is formed.

Incidentally, each of the light emitting elements is allotted with its unique identification number (an element number).

The LPH fixing member 20 absorptively retains the LPH 10, and previously fixes the LPH 10 at a set position, for example by an air suction.

The light reception section 30 receives the light irradiated from the LPH 10 so as to output a light amount value of the received light to the light reception control section/drive control section 60. For example, a CCD (Charge Coupled Device), a photo multiplier, a photo diode, and the like, may be named as the light reception section 30.

The drive section 40 comprises a motor; a guide rail which is extended in the main scanning direction at a position opposite to the irradiation side of the LPH 10, and the like. The drive section 40 retains the light reception section 30 at the position opposite to the irradiation side of the LPH 10 on the guide rail, and moves the light reception section 30 in the main scanning direction according to an instruction of the light reception control section/drive control section 60.

The LPH control section 50 controls the entire LPH 10 according to an instruction input by the control device 70. The LPH control section 50 sets an exposure time (a lighting time) of the light emitting elements, the light amount correction value, the light emitting elements to be lit, in the LPH 10 according to the instruction input by the control device 70, so as to perform a lighting control to light the selected light emitting elements during the exposure time.

The light reception control section/drive control section 60 performs photoelectric conversion processing and A/D conversion processing for the light amount value input from the light reception section 30 to calculate a light amount measurement value, so as to output the light amount measurement value to the control device 70. Further, the light reception control section/drive control section 60 drives the motor in the drive section 40 to move the light reception section 30 retained on the guide rail in the main scanning direction of the LPH 10, according to the instruction input from the control device 70.

The control device 70 is a device to integrally control the entire LPH evaluation device 1, comprising a control section 71; a storage section 72; a display section 73; an operation section 74, and the like.

The control section 71 comprises a CPU (Central Processing Unit); a ROM (Read Only Memory); a RAM (Random Access Memory), and the like, to read out system programs, each processing program, data, and the like, stored in the ROM or in the storage section 72, so as to expand the read out programs, and the like, in the RAM, thus controls the operations of each section in the control device 70 according to the expanded programs. Further, the control section 71 integrally controls the LPH control section 50 and the light reception control section/drive control section 60 so as to perform an integral control of the entire LPH evaluation device 1.

Further, the control section 71 reads out an LPH evaluation program, a light amount correction table, various data, and the like, stored in the ROM or in the storage section 72, so as to execute the LPH evaluation processing.

The LPH evaluation processing comprises the first to the third light amount adjustment processing; MTF Modulation Transfer Function) measurement processing; the first calculation processing; the second calculation processing; the third calculation processing; and a correction target specification processing.

The first to the third light amount adjustment processing are processing to adjust the light amount correction of the LPH In the MTF measurement processing, each light emitting element of the LPH is lit in a previously set lighting pattern by the LPH control section 50, based on the light amount set by the first to the third light amount adjustment processing. Further, the drive section 40 is driven by the light reception control section/drive control section 60 so that the light reception section 30 is moved to the position opposite to the light emitting element to be lit. Then, an MTF characteristic which is characteristic data for each light emitting element is calculated, based on the light amount measurement value which is obtained from the light received by the light reception section 30 and input by the light reception control section/drive control section 60.

The lighting pattern in the MTF measurement processing may be the lighting pattern in which every other light emitting element is lit (hereinbelow, also referred to as 1 (ON)-1 (OFF)). Otherwise, the lighting pattern may be one in which every 3 light emitting elements is lit (hereinbelow, also referred to as 1 (ON)-3 (OFF)), or one in which every 2 light emitting elements is lit by a unit of 2 elements (hereinbelow, also referred to as 2 (ON)-2 (OFF)).

In the first calculation processing, a first moving average value for each light emitting element in the previously set first moving average interval is calculated as a first calculation value, based on the characteristic data for each light emitting element.

In the second calculation processing, a second moving average value for each light emitting element in the previously set second moving average interval which is larger than the first moving average interval is calculated as a second calculation value which is different from the first calculation value (the first moving average value), based on the characteristic data for each light emitting element.

The first moving average interval in the first calculation processing and the second moving average interval in the second calculation processing are set according to the disposing configuration of the imaging lenses in the optical section of the LPH 10.

Figure 21:
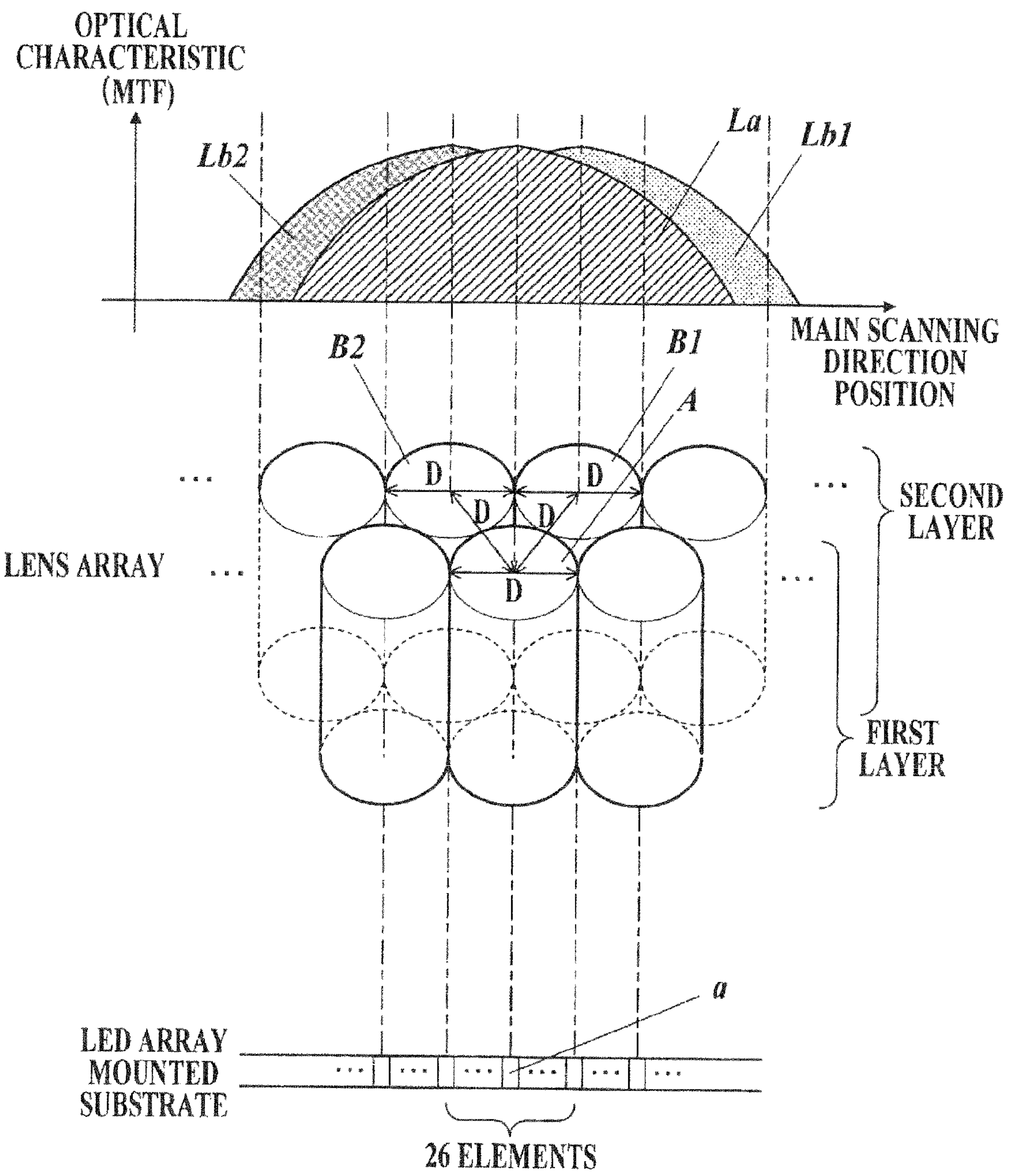
FIG. 21 is a diagram showing a relationship between an arrangement example of imaging lenses "in a state of being piled up" and the light emitting elements.

In the disposing configuration of the imaging lenses according to the present embodiment, a plurality of imaging lenses are arranged in 2 lines in the main scanning direction with an arrangement what is referred to as “a state of being piled up”. FIG. 21 shows the relation ship between the arrangement example of the imaging lenses “in the state of being piled up” and the light emitting elements. As shown in FIG. 21, the arrangement of “the state of being piled up” is formed as follows. That is, the cylindrical imaging lenses are aligned so as to be adjacent to each other in the radial direction to form a first layer. Then, each of the imaging lenses in the second layer which is formed in the same manner as the first layer is disposed on each valley generated in between the two imaging lenses in the first layer which are mutually adjacent. In the arrangement of “the state of being piled up”, the distance in between the axes of the two adjacent imaging lenses is equivalent to the sum of the radius length of the two imaging lenses, that is to say, the length of the diameter D.

In a case where the arrangement is formed “in a state of being piled up”, it is known that black noise lines are to be generated. The black noise lines are caused by an imaging lens A which has the highest optical contribution of the light irradiated from a certain light emitting element “a”, and by imaging lenses B1 and B2 which have the second highest optical contribution next to the imaging lens A. (That is to say, the two imaging lenses B1, B2 are imaging lenses in a layer different from a layer to which the imaging lens A belongs, and are adjacent to the imaging lens A).

In a case where the resolution of the LPH is 1200 [dpi] (=21.2 [μm]), and the diameter D of the imaging lens is 0.568 [nm], the number of the light emitting elements arranged in the diameter D of the imaging lens is approximately 26. The optical characteristics in a case where the light emitting element “a” is lit as shown in FIG. 21 is caused by an optical characteristic La by the imaging lens A and optical characteristics Lb1, Lb2 by the imaging lenses B1, B2. The number of the light emitting elements, the irradiation light of which is received and collected by the imaging lenses A, B1, B2, is approximately 52, which is the number of the light emitting elements arranged in the diameter D of the two adjacent imaging lenses. Accordingly, 52 is the minimum number of elements which contribute to the detection accuracy in which the black noise lines are generated, and it is preferable to set the first moving average interval to this number of elements.

It is required that the second moving average interval is set to the number of elements needed to smooth the MTF curve line in which the MTF values of each light emitting elements are graphed out. When the first moving average interval is set to 52 elements, the second moving average interval is preferably set to 768 elements.

In the third calculation processing, the difference value is calculated as the third calculation value by subtracting the first moving average value from the second moving average value, based on the first moving average value as the first calculation value and on the second moving average value as the second calculation value, for each light emitting element.

In the correction target specification processing, the difference value as the third calculation value calculated in the third calculation processing is displayed in the display section 73. The light emitting element in which the difference value displayed in the display section 73 is to be not less than a previously set threshold value can be specified as the correction target light emitting element. It is preferable that the threshold value ranges from 1.6 to 2.0.

The storage section 72 is configured with a nonvolatile memory such as a flash memory and the like, to store various programs and data in a state of being rewritable. Further, the storage section 72 stores necessary various data such as: the light amount correction table in which the light amount correction value at an initial point (an initial light amount correction value) which is previously set for each light emitting element provided in the LPH; a line period which is to be used in the first to the third light amount adjustment processing; an exposure time; various lighting patterns which are to be used in the MTF measurement processing; the threshold value, and the like. The storage section 72 further stores a table of the light amount measurement value obtained by receiving light in the light reception section 30 (the light amount measurement table); the calculated light amount correction value for each light emitting element; the MTF values; the difference values, and the like.

The display section 73 comprises a display screen using an LCD (Liquid Crystal Display), an organic EL (Electronic Luminescent) element, or the like. The display section 73 displays various display screens to input various setting conditions and to display various processing results, and the like, according to a display signal input by the control section 71.

The operation section 74 comprises various operation key groups, a touch panel to cover the display screen of the display section 73, and the like. The operation section 74 outputs an operation signal input from the operation key group or the touch panel to the control section 71.

Next, the operation according to the present embodiment will be described.

Figure 2:
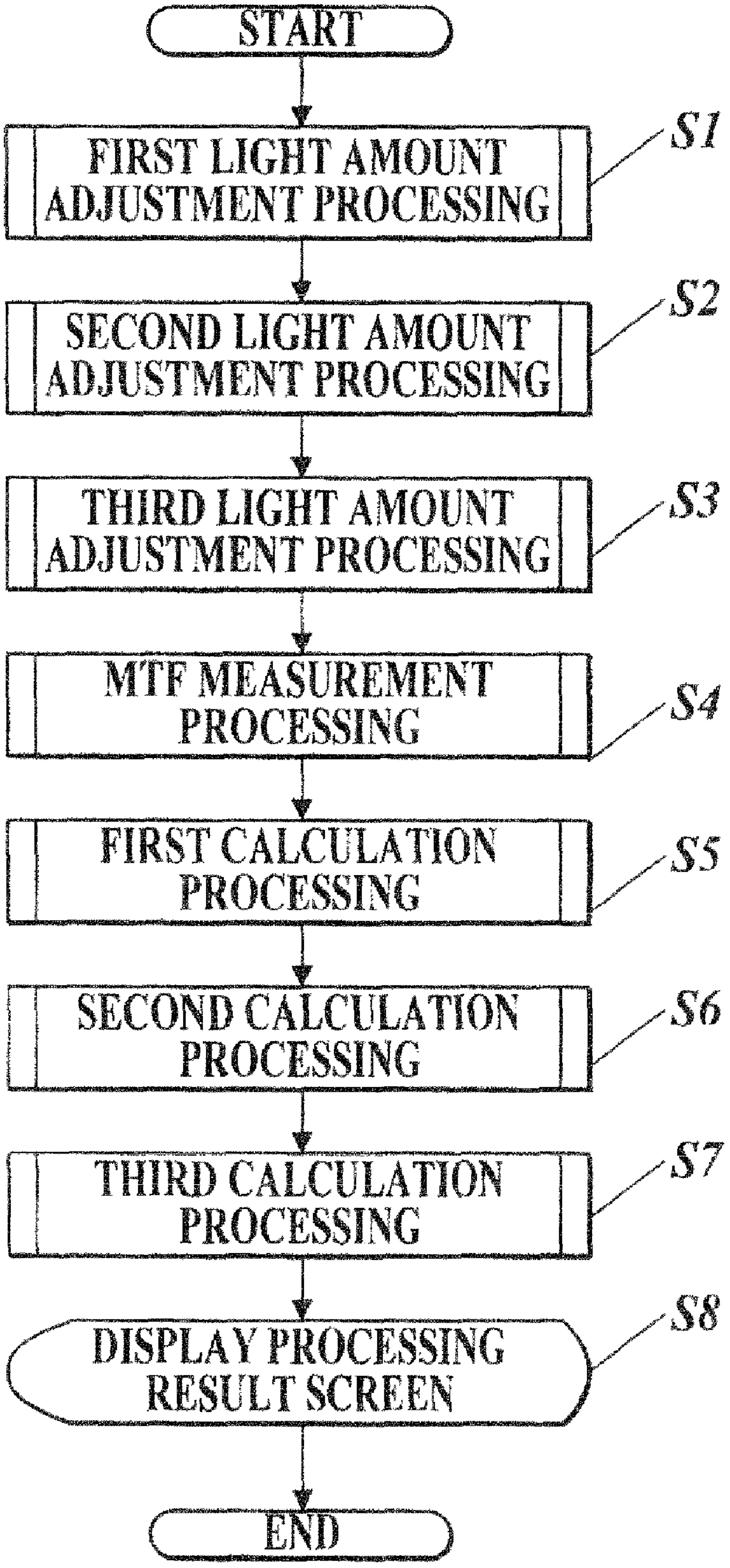
FIG. 2 is a main flow chart of an LPH evaluation processing.

FIG. 2 shows the main flow chart of the LPH evaluation processing according to the present embodiment.

This processing is executed by the cooperation of the control section 71 and each of the sections.

The control section 71 instructs the first light amount adjustment processing to be executed (step S1), and instructs the second light amount adjustment processing to be executed when the first light amount adjustment processing has been executed (step S2), and further instructs the third light amount adjustment processing to be executed when the second light amount adjustment processing has been executed (step S3).

When the execution of the third light amount adjustment processing has been completed by the control section 71, the light amount variation of the light emitting elements provided in the LPH 10 is adjusted to be not more than the previously set value.

Incidentally, the detail of the first to the third light amount adjustment processing will be described later.

The control section 71 executes the MTF measurement processing for the LPH 10 in which the light amount variability of the light emitting elements is adjusted (step S4). Incidentally, the MTF measurement processing includes a canonical processing to calculate the MTF value for each light emitting element for each lighting pattern; and a summary processing to calculate the common MTF value for four light emitting elements which are arranged continuously. It is preferable to use the summary processing in a case where the improvement of calculation efficiency is intended. Incidentally, the detail of the canonical processing and the summary processing for each lighting pattern will be described later.

The control section 71 executes the first calculation processing when the MTF measurement processing has been executed (step S5).

In the first calculation processing according to the present embodiment, the first moving average interval is set to be 52 elements, and the first moving average value of each light emitting element is calculated in a state where each light emitting element is placed in the center of the first moving average interval.

First, the first calculation processing in a case where the MTF value is calculated by the canonical processing is described.

The first moving average value MTFa1($n$) of the light emitting element having the element number "n" is calculated by the following formula (1).

$$MTFa1(n)=(MTF(n-25)+\ldots+MTF(n)+\ldots+MTF(n+26))/52 \quad (1)$$

Incidentally, the first moving average value of the element number (n=1-25) which is less than half of the first moving average interval is set to be the first moving average value of the light emitting element of the element number n=26. Further, the first moving average value from the last element number (for example, n=15360) to the element number which is less than half of the first moving average interval (n=15335-15360) is set to be the first moving average value of the light emitting element of the element number n=15334.

Next, the first calculation processing in a case where the MTF value is calculated by the summary processing is described.

The MTF value calculated in the summary processing is the common MTF value for every four light emitting elements. Accordingly, in a case where the first moving average interval is set to be 52 elements, the first moving average value is calculated for a unit of 13 groups wherein one group is consisted of four elements. For example, the first moving average value for each group is calculated based on the MTF value of the light emitting elements of the element number representing the multiples of four. The first moving average value MTFa1($n$) of the light emitting elements of the element number which is the smallest among those of the light emitting elements included in the group number "m" is calculated by the following formula (2).

$$MTFa1(n)=(MTF(n-24)+MTF(n-20)+MTF(n-16)+MTF(n-12)+MTF(n-8)+MTF(n-4)+MTF(n)+MTF(n+4)+MTF(n+8)+MTF(n+12)+MTF(n+16)+MTF(n+20)+MTF(n+24))/13 \quad (2)$$

Incidentally the first moving average value of the light emitting elements in the half of number of groups (the first group to the sixth group) in the first moving average interval is set to be the first moving average value of the light emitting element in the seventh group. Further, the first moving average value of the light emitting elements which belong to the last group (group M) to group of the half number of intervals among the first moving average interval (group M to "M−6"$^{th}$ group) is set to be the first moving average value of the light emitting element in the "M−7"$^{th}$ group.

The control section 71 executes the second calculation processing when the MTF measurement processing has been executed (step S6).

In the second calculation processing according to the present embodiment, the second moving average interval is set to be 768 elements, and the second moving average value of each light emitting element is calculated in a state where each light emitting element is placed in the center of the second moving average interval.

First, the second calculation processing in a case where the MTF value is calculated by the canonical processing is described.

The second moving average value MTFa2(*n*) of the light emitting element having the element number "n" is calculated by the following formula (3).

$$MTFa2(n)=(MTF(n-383)+\ldots+MTF(n)+\ldots+MTF(n+384))/768 \quad (3)$$

Incidentally, the second moving average value of the element number (n=1-384) which is less than half of the second moving average interval is set to be the second moving average value of the light emitting element of the element number n=385. Further, the second moving average value from the last element number (for example, n=15360) to the element number which is not more than half of the second moving average interval (n=15335-15360) is set to be the second moving average value of the light emitting element of the element number n=14976.

Next, the second calculation processing in a case where the MTF value is calculated by the summary processing is described.

As described above, MTF value calculated in the summary processing is the common MTF value for every four light emitting elements. Accordingly, in a case where the second moving average interval is set to be 768 elements, the second moving average value is calculated for a unit of 192 groups wherein one group is consisted of four elements. For example, the second moving average value for each group is calculated based on the MTF value of the light emitting elements of the element number representing the multiples of four. The second moving average value MTFa2(*n*) of the light emitting elements of the element number which is the smallest among those of the light emitting elements included in the group number "m" is calculated by the following formula (4).

$$MTFa2(n)=(MTF(n-84)+MTF(n-380)+\ldots+MTF(n-4)+MTF(n)+MTF(n+4)+\ldots+MTF(n+376)+MTF(n+380))/192 \quad (4)$$

Incidentally, the second moving average value of the light emitting elements in less than half of number of groups (the first group to the 96$^{th}$ group) in the second moving average interval is set to be the second moving average value of the light emitting element in the 97$^{th}$ group (the light emitting elements of the element number n=385-388). Further, the second moving average value of the light emitting elements which belong to the last group (group M) to group of the half number of intervals (M$^{th}$ group to the "M−96"$^{th}$ group) among the second moving average interval is set to be the second moving average value of the light emitting element in the "M−97"$^{th}$ group.

The control section 71 executes the third calculation processing in which the difference value MTFd(n) obtained by subtracting the first moving average value MTFa1(*n*) from the second moving average value MTFa2(*n*) of each light emitting element is calculated, when the first calculation processing and the second calculation processing have been executed (step S7).

The control section 71 graphs out the first moving average value, the second moving average value and the difference value of each light emitting element, respectively, and instructs the display section 73 to display the processing result screen in which the previously set threshold value for the difference value is graphed out (step S8), so as to terminate the LPH evaluation processing.

Figure 3:
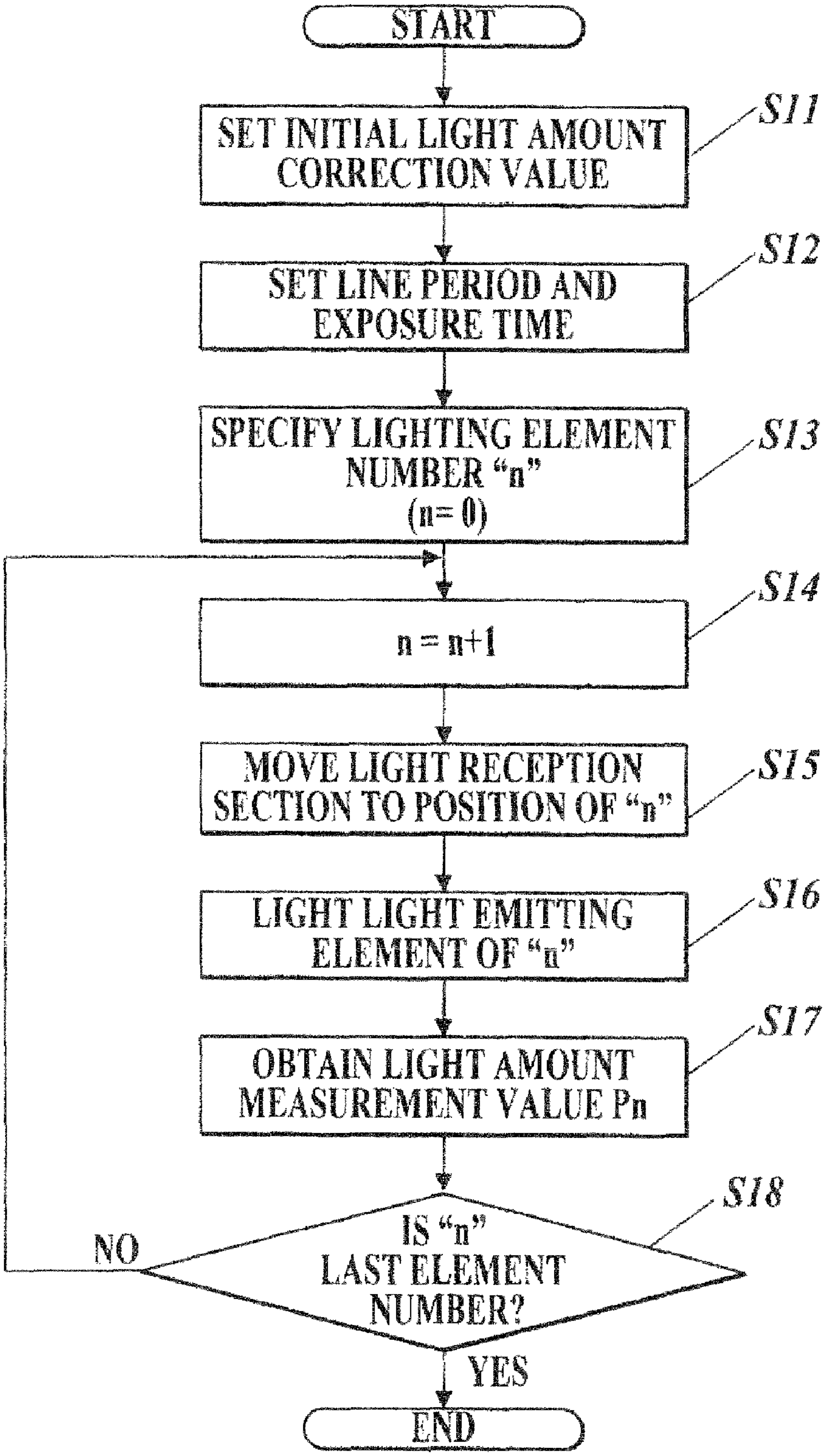
FIG. 3 is a flow chart of a first light amount adjustment processing.

FIG. 3 shows the flow chart of the first light amount adjustment processing.

The control section 71 reads out the light amount correction table in which the previously set initial light amount correction value is stored, from the storage section 72 to instruct the LPH control section 50 to set the initial light amount correction value which is to be the current adjustment value of each light emitting element, for each light emitting element (step S11). Further, the control section 71 reads out the line period and the exposure time from the storage section 72 to instruct the LPH control section 50 to set the line period of the LPH 10 and the exposure time of each light emitting element for the LPH 10 (step S12).

The control section 71 specifies the element number to be lit (lighting element number) "n" to 0 (step S13), and then adds 1 to the lighting element number "n" (step S14). The control section 71 instructs the light reception control section/drive control section 60 to drive the drive section 40 so as to move the light reception section 30 to a position corresponding to the lighting element number "n" (step S15).

The control section 71 instructs the LPH control section 50 to light the light emitting element of the lighting element number "n" (step S16), obtains a light amount measurement value P(n) in which the light amount value of the light received by the light reception section 30 is converted by the light reception control section/drive control section 60, so as to store the obtained light amount measurement value P(n) in the light amount measurement table (step S17).

Figure 4:
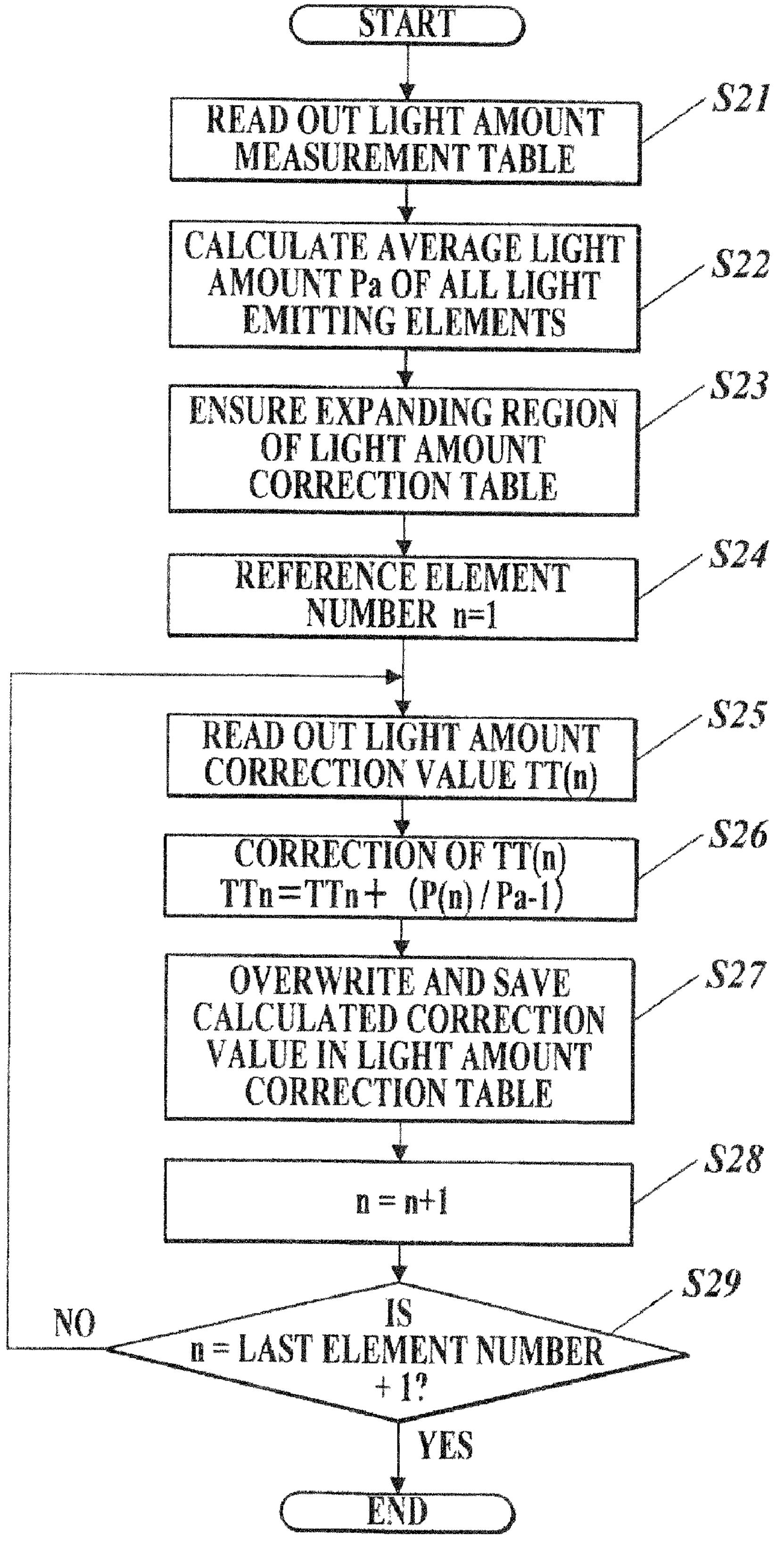
FIG. 4 is a flow chart of a second light amount adjustment processing.

The control section 71 judges whether the lighting element number "n" is the last element number or not (step S18). When the lighting element number "n" is not the last element number in step S18 (step S18; No), the first light amount adjustment processing is returned to step S14. When the lighting element number "n" is the last element number in step S18 (step S18; Yes), the first light amount adjustment processing is terminated FIG. 4 shows the flow chart of the second light amount adjustment processing.

The control section 71 reads out the light amount measurement table stored in the storage section 72 (step S21), calculates an average light amount Pa of the entire light emitting elements from the light amount measurement value of each light emitting element (step S22), and ensures an expanding region of the light amount correction table in the storage section 72 (step S23).

The control section 71 sets the element number of the light emitting element to be referred to (a reference element number) "n" to 1 (step S24), and reads out the light amount correction value TT(n) of the reference element number "n" stored in the light amount correction table (step S25).

The control section 71 performs the correction for the light amount correction value TT(n), based on the read out light amount correction value TT(n) of the reference element number "n", the light amount measurement value P(n) and the average light amount Pa of the reference element number "n", to calculate the new light amount correction value TT(n) (step S26). To put it concretely, the new light amount correction value TT(n) is obtained by dividing the light amount measurement value P(n) by the average light amount Pa, subtracting 1 therefrom and adding the read out light amount correction value TT(n) thereto. The following formula (5) shows the calculation formula of the new light amount correction value TT(n).

$$TT(n)=TT(n)+(P(n)/Pa-1) \tag{5}$$

The control section 71 overwrites and saves the light amount correction value TT(n) which is calculated in step S26, in the light amount correction table (step S27), and adds 1 to the reference element number "n" (step S28).

The control section 71 judges whether the reference element number "n" equivalent to the value in which 1 is added to the last element number or not (step S29). When the reference element number "n" is not equivalent to the value in which 1 is added to the last element number (step S29; No), the second light amount adjustment processing is returned to step S25. When the reference element number "n" is equivalent to the value in which 1 is added to the last element number (step S29; Yes), the second light amount adjustment processing is terminated.

Figure 5:
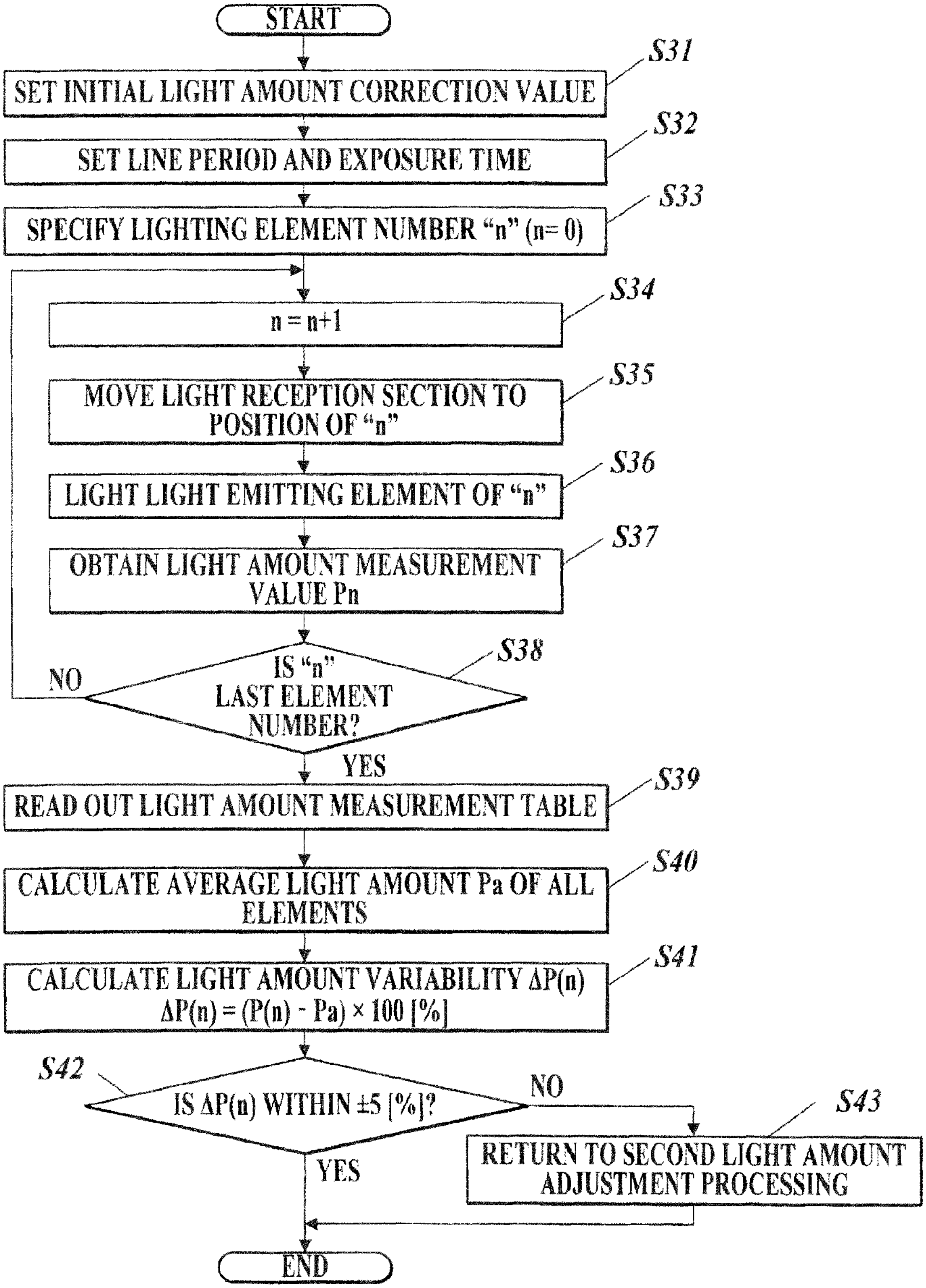
FIG. 5 is a flow chart of a third light amount adjustment processing.

FIG. 5 shows the flow chart of the third light amount adjustment processing.

The control section 71 reads out the light amount correction table (that is to say, the light amount correction table in which the light amount correction value calculated by the second light amount adjustment processing is stored), and instructs the LPH control section 50 to set the light amount correction value which is to be the current adjustment value of each light emitting element, for each light emitting element (step S31). Incidentally, steps S32-S38 are performed in the same manner as step S12-S18 in the first light amount adjustment processing, thus the description thereof is omitted.

The control section 71 reads out the light amount correction table generated by the present processing (step S39), and calculates an average light amount Pa of the entire light emitting elements from the light amount measurement value of each light emitting element (step S40).

The control section 71 calculates the light amount variability ΔP(n) of each light emitting element, based on the light amount measurement value P(n) and the average light amount Pa of each light emitting element (step S41). To put it concretely, the light amount variability ΔP(n) is obtained by dividing the light amount measurement value P(n) by the average light amount Pa and multiplying 100 so as to be shown in a percentage [%]. The following formula (6) shows the calculation formula of the light amount variability ΔP(n) of each light emitting element of the element number "n".

$$\Delta P(n)=(P(n)-Pa)\times 100[\%] \tag{6}$$

The control section 71 judges whether the light amount variability ΔP(n) of the entire light emitting elements are within the range of ±5[%] or not (step S42). When the light amount variability ΔP(n) of the entire light emitting elements is not always within the range of ±5[%] (step S42; No), the third light amount adjustment processing returns to the second light amount adjustment processing (step S43) so as to be terminated. When the light amount variability ΔP(n) of the entire light emitting elements is within the range of ±5[%] (step S42; Yes), the third light amount adjustment processing is terminated.

The first to the third light amount adjustment processing are executed so that the light amount variability of the entire light emitting elements is adjusted within a predetermined range (±5[%]) Thereby, the calculation accuracy of the MTF value of each light emitting element which is calculated in the MTF measurement processing to be executed later can be improved, thus the reliability of the specification accuracy of the correction target light emitting element can be improved.

Next, the MTF measurement processing is described.

The lighting patterns of the MTF measurement processing according to the present embodiment comprises 3 lighting patterns of 1(ON)-1(OFF), 1(ON)-3(OFF), and 2 (ON)-2 (OFF). As the types of the MTF measurement processing according to the present embodiment, there are combinations of either one of the lighting patterns with the MTF calculation processing of either canonical processing or the summary processing. The MTF measurement processing executed in step S4 uses the MTF measurement processing of any one of the combinations.

First, the MTF measurement processing in which the lighting pattern is 1(ON)-1(OFF), which conventionally is most commonly used is described.

Hereinbelow, the MTF measurement processing of the canonical processing in 1(ON)-1(OFF) is described.

First, in the MTF measurement processing in the canonical processing in 1(ON)-1(OFF), the light emitting elements of every other element from the first light emitting element (for example, the light emitting elements with an odd number (the element number "n"=1, 3, 5 . . . )) are sequentially lit, and the light reception section 30 is moved to the position of the light emitting element to be lit. Thus the MTF value of each of the lit light emitting elements (for example, the light emitting elements with the odd number) is calculated by the control section 71, based on the maximum light amount value and the minimum light amount value of the lit light emitting elements. Subsequently, in the MTF measurement processing in the canonical processing in the lighting pattern of 1(ON)-1 (OFF), the light emitting elements which are not lit (for example, the light emitting elements with the even number (the element number "n"=2, 4, 6 . . . )) are sequentially lit, and the light reception section 30 is moved to the position of the light emitting element to be lit. Thus the MTF value of each of the lit light emitting elements (for example, the light emitting elements with the even number) is calculated by the control section 71, based on the maximum light amount value and the minimum light amount value of the lit light emitting elements.

Figure 6:
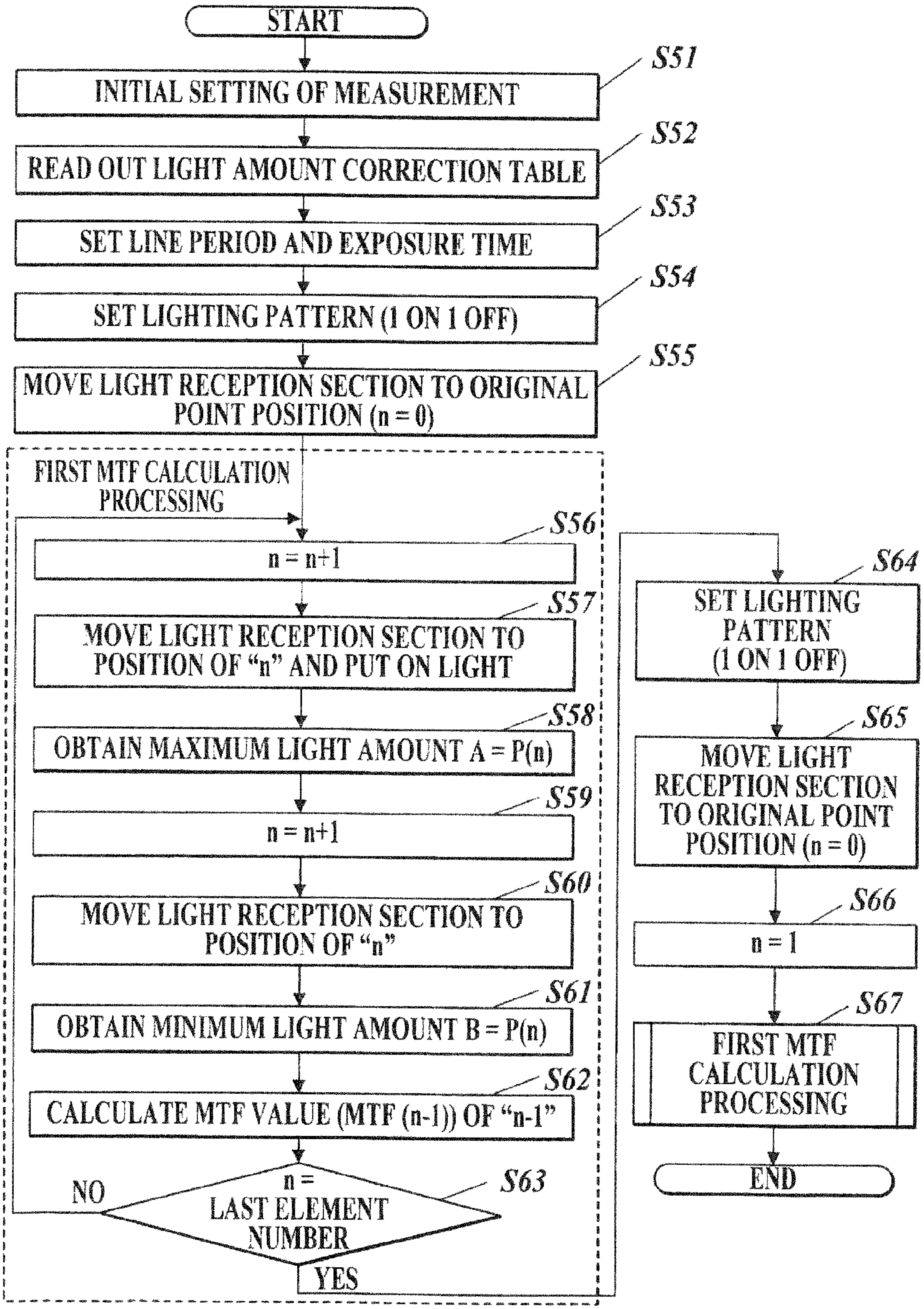
FIG. 6 is a flow chart of an MTF measurement processing of a canonical processing in which a lighting pattern is 1 (ON)-1 (OFF)

FIG. 6 shows the flow chart of the MTF measurement processing in the canonical processing in the lighting pattern of 1(ON)-1(OFF).

The control section 71 performs an initial setting of each section before the measurement (step S51). For example, the control section 71 instructs the light reception control section/drive control section 60 to move the light reception section 30 to an original point position on the guide rail, and performs the reference adjustment of the light reception section 30, an initial setting of the A/D conversion circuit and the storage memory in the light reception control section/drive control section 60, and the like.

The control section 71 reads out the light amount correction table from the storage section 72 to instruct the LPH control section 50 to set the light amount correction value which is to be the current adjustment value of each light emitting element, for each light emitting element (step S52), after step S51. The light amount correction table read out in step S52 is the light amount correction table in which the light amount correction value calculated in the second light amount adjustment processing is stored.

Further, the control section 71 reads out the line period and the exposure time from the storage section 72 to instruct the LPH control section 50 to set the line period of the LPH 10 and the exposure time of each light emitting element for the LPH 10 (step S53)

The control section 71 instructs the LPH control section 50 to set the lighting pattern to 1(ON)-1(OFF) in which the light emitting elements with an odd number (the element number "n"=1, 3, 5 . . . ) are sequentially lit (step S54). The control section 71 instructs the light reception control section/drive control section 60 to move the light reception section 30 to the original point position, and sets the reference element number "n" to 0 (step S55).

The control section 71 adds 1 to the reference element number "n" (step S56), instructs the light reception control section/drive control section 60 to drive the drive section 40 so as to move the light reception section 30 to the position corresponding to the reference element number "n", and instructs the LPH control section 50 to light the light emitting element of the reference element number "n" (step S57). The control section 71 obtains the light amount measurement value P(n) in which the light amount value of the light received by the light reception section 30 is converted by the light reception control section/drive control section 60, as the maximum light amount value A of the lit light emitting element (step S58).

The control section 71 adds 1 to the reference element number "n" (step S59), and instructs the light reception control section/drive control section 60 to drive the drive section 40 so as to move the light reception section 30 to the position corresponding to the reference element number "n" (step S60). The control section 71 obtains the light amount measurement value P(n) in which the light amount value of the light received by the light reception section 30 is converted by the light reception control section/drive control section 60, as the minimum light amount value B of the light emitting element lit in step S57 (step S61).

The control section 71 calculates the MTF value MTF(n-1) of the reference element number "n−1", based on the maximum light amount value A obtained in step S58 and the minimum light amount value B obtained in step S61 (step S62). The MTF value calculated in step S62 can be calculated by the following formula (7).

$$MTF(n-1)=((A-B)/(A+B))\times 100[\%] \quad (7)$$

The control section 71 judges whether the reference element number "n" is the last element number or not (step S63) When the reference element number "n" is not the last element number in step S63 (step S63; No), the MTF measurement processing of the canonical processing in the lighting pattern of 1(ON)-1(OFF) is returned to step S56. The processing performed in steps S56-63 is hereinbelow referred to as the first MTF calculation processing.

When the reference element number "n" is the last element number in step S63 (step S63; Yes), the control section 71 instructs the LPH control section 50 to set the lighting pattern to 1(ON)-1(OFF) in which the light emitting elements with an even number (the element number "n"=2, 4, 6 . . . ) are sequentially lit (step S64) The control section 71 instructs the light reception control section/drive control section 60 to move the light reception section 30 to the original point position, and sets the reference element number "n" to 0 (step S65). Subsequently, the control section 71 sets the reference element number "n" to 1 (step S66), and executes the first MTF calculation processing (step S67), so that the MTF measurement processing of the canonical processing in the lighting pattern of 1(ON)-1(OFF) is terminated.

Next, the MTF measurement processing of the summary processing in 1(ON)-1(OFF) is described.

In the MTF measurement processing of the summary processing in the lighting pattern of 1(ON)-1(OFF), two light emitting elements arranged continuously are regarded as one group, and the MTF value of either one of the light emitting elements in each group is calculated so as to regard the calculated MTF value as the common MTF value of the group.

In the MTF measurement processing of the summary processing in the lighting pattern of 1(ON)-1(OFF) according to the present embodiment, the light emitting elements of every other element from the first light emitting element (for example, the light emitting elements with an odd number (the element number "n"=1, 3, 5 . . . )) are sequentially lit, and the light reception section 30 is moved to the position of the light emitting element to be lit. Thus the MTF value of each of the lit light emitting elements (for example, the light emitting elements with the odd number) is calculated by the control section 71, based on the maximum light amount value and the minimum light amount value of the lit light emitting elements. In the MTF measurement processing of the summary processing in the lighting pattern of 1(ON)-1(OFF), each of the calculated MTF value is regarded as the common MTF value of the lit light emitting elements (for example, the light emitting element with the odd number) and the light emitting elements adjacent to the lit light emitting elements (for example, the light emitting elements with even number).

Accordingly, the canonical processing is processing in which the entire light emitting elements are lit to calculate the MTF value of each light emitting element, whereas the summary processing is processing in which the first MTF processing is to be executed once. Thus, the number of the light emitting elements to be lit can be reduced to half so as to abbreviate the measurement and calculation processing in the summary processing compared to the case of the canonical processing.

Figure 7:
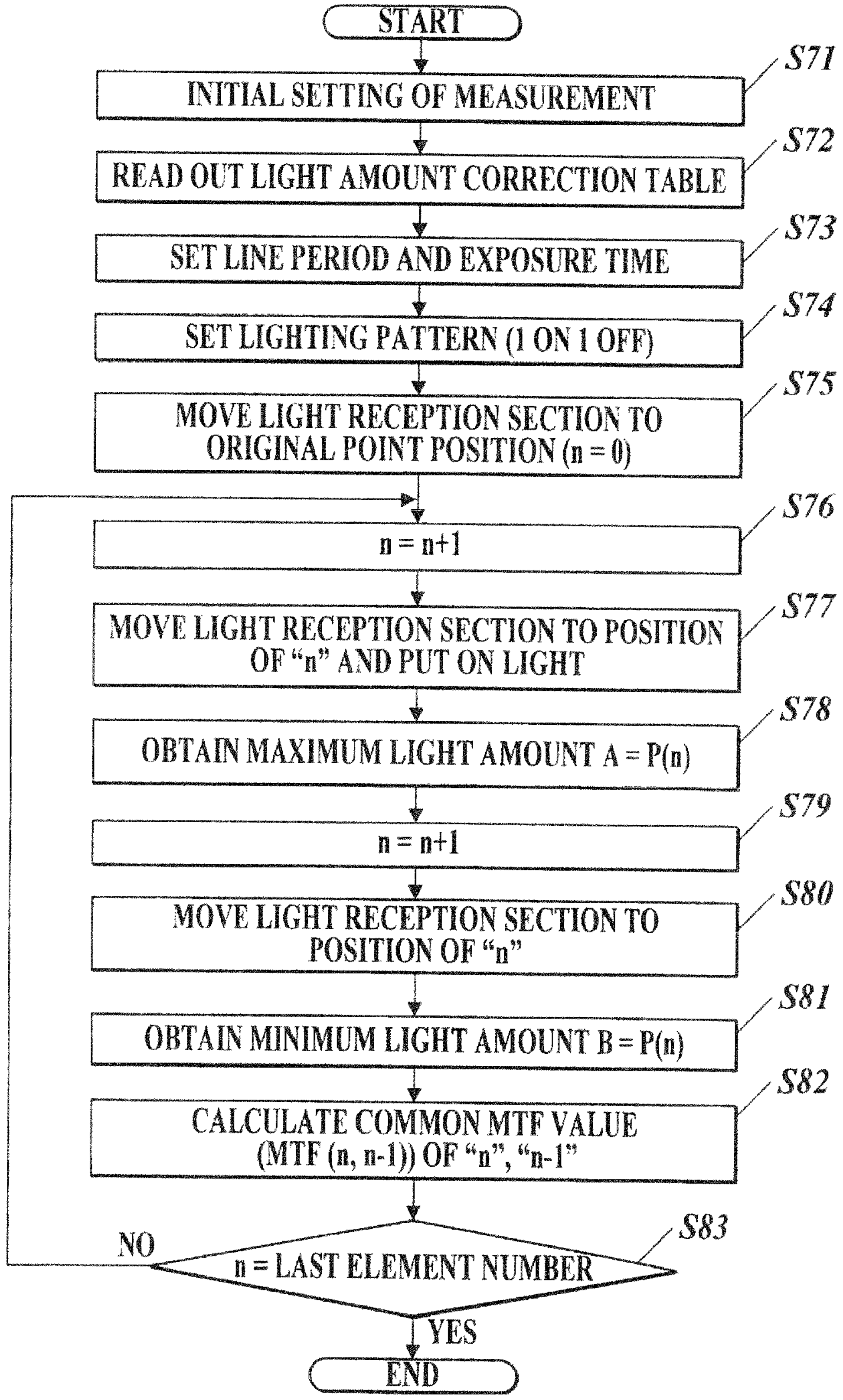
FIG. 7 is a flow chart of the MTF measurement processing of a summary processing in which the lighting pattern is 1 (ON)-1(OFF)

FIG. 7 shows the flow chart of the MTF measurement processing in the summary processing in the lighting pattern of 1(ON)-1(OFF). Incidentally, steps S71-S81 are performed in the same manner as step S51-S61 in FIG. 6, thus the description thereof is omitted.

The control section 71 calculates the common MTF value MTF(n−1, n) of the reference element numbers "n−1" and "n", based on the maximum light amount value A obtained in step S78 and the minimum light amount value B obtained in step S81 (step S82). The MTF value calculated in step S82 can be calculated by the following formula (8).

$$MTF(n-1,n)=((A-B)/(A+B))\times 100[\%] \quad (8)$$

The control section 71 judges whether the reference element number "n" is the last element number or not (step S83). When the reference element number "n" is not the last element number in step S83 (step S83; No), the MTF measurement processing of the summary processing in the lighting pattern of 1(ON)-1(OFF) is returned to step S76. When the reference element number "n" is the last element number in step S83 (step S83; Yes), the MTF measurement processing of the summary processing in the lighting pattern of 1(ON)-1 (OFF) is terminated.

Next, The MTF measurement processing in the lighting pattern of 1(ON)-3(OFF) is described.

First, the MTF measurement processing of the canonical processing in 1(ON)-3(OFF) is described.

In the MTF measurement processing of the canonical processing in the lighting pattern of 1(ON)-3(OFF), four light emitting elements arranged continuously are regarded as one group, and the MTF value is calculated for each element.

In the MTF measurement processing of the canonical processing in the lighting pattern of 1(ON)-3(OFF), the calculation is performed by the control section 71 as follows. That is, first, the MTF value of the light emitting element arranged at one edge portion of each group is calculated. Subsequently, the MTF value of the element adjacent to the one edge portion of each group is calculated Then the MTF value of the element adjacent to the other edge portion of each group is calculated. Finally, the MTF value of the element arranged at the other edge portion of each group is calculated.

Figure 8:
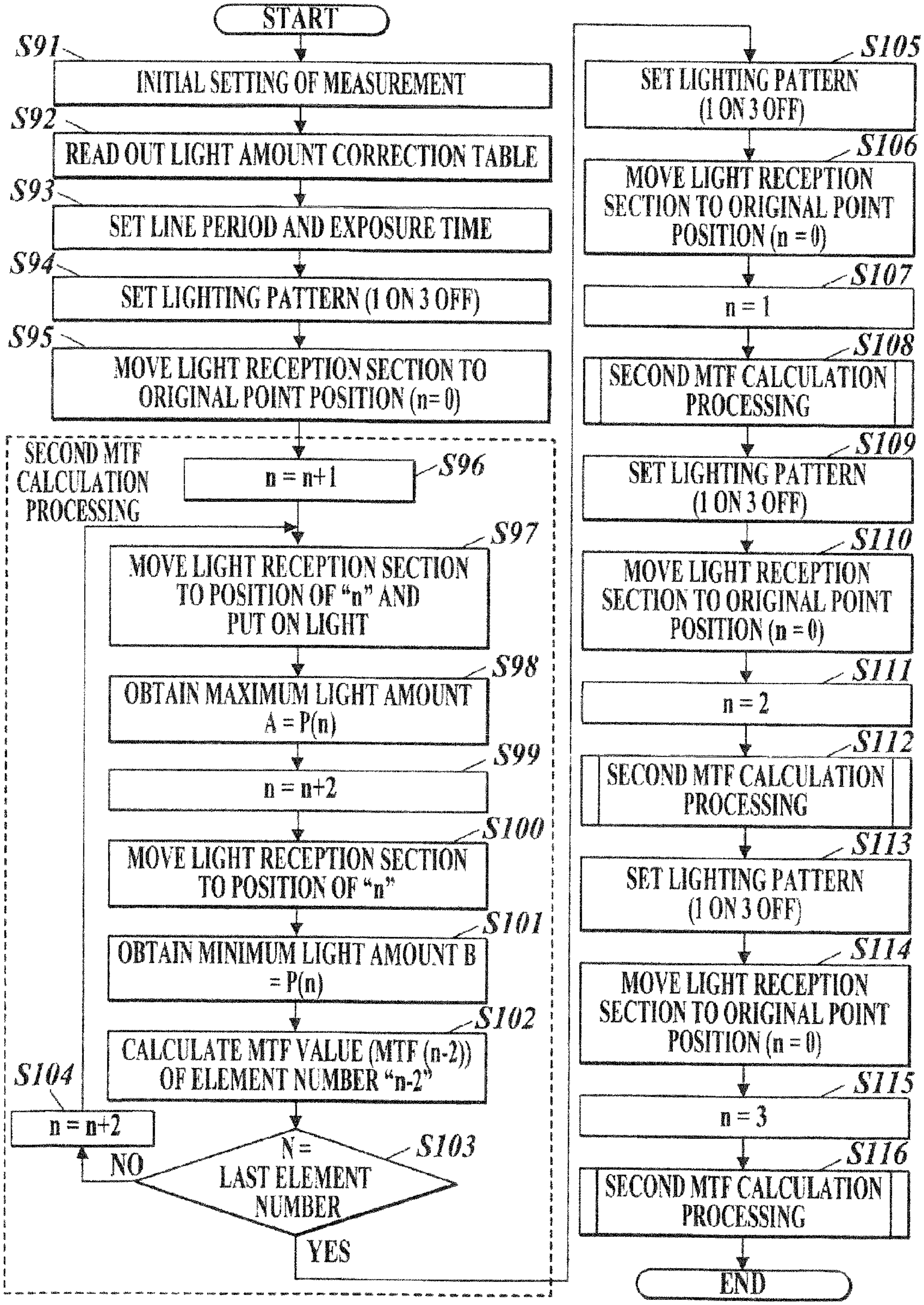
FIG. 8 is a flow chart of the MTF measurement processing of the canonical processing in which the lighting pattern is 1 (ON)-3(OFF)

FIG. 8 shows the flow chart of the MTF measurement processing in the canonical processing in the lighting pattern of 1(ON)-3(OFF), and FIGS. 9A-9D show the lighting pattern examples in the present processing. Incidentally, steps S91-S93 are performed in the same manner as step S61-S63 in FIG. 6, thus the description thereof is omitted.

The control section 71 instructs the LPH control section 50 to set the lighting pattern to 1(ON)-3(OFF) in which the light emitting elements arranged at one edge portion of each group are sequentially lit (step S94). The control section 71 instructs the light reception control section/drive control section 60 to move the light reception section 30 to the original point position, and sets the reference element number "n" to 0 (step S95).

The control section 71 adds 1 to the reference element number "n" (step S96), instructs the light reception control section/drive control section 60 to drive the drive section 40 so as to move the light reception section 30 to the position corresponding to the reference element number "n", and instructs the LPH control section 50 to light the light emitting element of the reference element number "n" (step S97) The control section 71 obtains the light amount measurement value P(n) in which the light amount value of the light received by the light reception section 30 is converted by the light reception control section/drive control section 60, as the maximum light amount value A of the lit light emitting element (step S98).

The control section 71 adds 2 to the reference element number "n" (step S99), and instructs the light reception control section/drive control section 60 to drive the drive section 40 so as to move the light reception section 30 to the position corresponding to the reference element number "n" (step S100). The control section 71 obtains the light amount measurement value P(n) in which the light amount value of the light received by the light reception section 30 is converted by the light reception control section/drive control section 60, as the minimum light amount value B of the light emitting element lit in step S97 (step S101).

The control section 71 calculates the MTF value MTF(n−2) of the reference element number "n−2", based on the maximum light amount value A obtained in step S98 and the minimum light amount value B obtained in step S101 (step S102). The calculation formula of the MTF value in step S102 is the same as the above described formula (8).

The control section 71 judges whether the reference element number "n" is the last element number or not (step S103). When the reference element number "n" is not the last element number in step S103 (step S103; No), the reference element number "n" is added with 2 (step S104), and the processing is returned to step S97. The processing performed in steps S96-104 is hereinbelow referred to as the second MTF calculation processing.

Figure 9A:
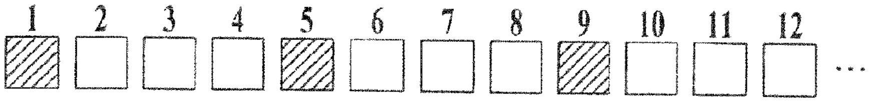
FIG. 9A is a diagram showing a lighting pattern example (an example of light emitting elements disposed on one edge portion of each group being sequentially lit) of the canonical processing of 1 (ON)-3 (OFF)

In the processing performed in steps S94-S104, the light emitting elements arranged at one edge portion of each group (for example, the light emitting elements of element number "n"=1, 5, 9 . . . , as shown in FIG. 9A) are sequentially lit and the light reception section 30 is moved to the position of the light emitting element to be lit, thus the maximum light amount value for the lit light emitting element is obtained. Further, in the processing performed in steps S94-S104, the light reception section 30 is moved to the position of the light emitting element located at the center (for example, the light emitting elements of element number "n"=3, 7, 11 . . . ) among the three continuous light emitting elements which belong to the same group as the lit light emitting element, thus the minimum light amount value for the lit light emitting element is obtained. Subsequently, in the processing performed in steps S94-S104, the MTF value of the lit light emitting element is calculated, based on the maximum light amount value and the minimum light amount value, thus the calculated MTF value is regarded as the MTF value of the light emitting element at one edge portion of each group.

When the reference element number "n" is the last element number (step S13; Yes), the control section 71 instructs the LPH control section 50 to set the lighting pattern to 1(ON)-3(OFF) in which the light emitting elements adjacent to the one edge portion of each group are sequentially lit (step S105). The control section 71 instructs the light reception control section/drive control section 60 to move the light reception section 30 to the original point position, and sets the reference element number "n" to 0 (step S106). Subsequently, the control section 71 sets the reference element number "n" to 1 (step S107), and executes the second MTF calculation processing (step S108).

Figure 9B:
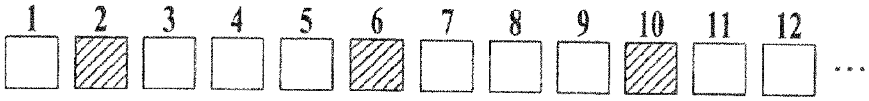
FIG. 9B is a diagram showing the lighting pattern example (the example of light emitting elements adjacent to one edge portion of each group being sequentially lit) of the canonical processing of 1 (ON)-3 (OFF)

In the processing performed in steps S105-S108, the light emitting elements adjacent to one edge portion of each group (for example, the light emitting elements of element number "n"=2, 6, 10 . . . , as shown in FIG. 9B) are sequentially lit and the light reception section 30 is moved to the position of the light emitting element to be lit, thus the maximum light amount value for the lit light emitting element is obtained. Further, in the processing performed in steps S105-S108, the light reception section 30 is moved to the position of the light emitting element located at the center (for example, the light emitting elements of element number "n"=4, 8, 12 . . . ) among the three continuous light emitting elements which belong to the same group as the lit light emitting element, thus the minimum light amount value for the lit light emitting element is obtained. Subsequently, in the processing performed in steps S105-S108, the MTF value is calculated, based on the maximum light amount value and the minimum light amount value, thus the calculated MTF value is regarded as the MTF value of the light emitting element adjacent to one edge portion of each group.

When the processing in step S108 has been performed, the control section 71 instructs the LPH control section 50 to set the lighting pattern to 1(ON)-3(OFF) in which the light emitting elements adjacent to the other edge portion of each group are sequentially lit (step S109). The control section 71 instructs the light reception control section/drive control section 60 to move the light reception section 30 to the original point position, and sets the reference element number "n" to 0 (step S110). Subsequently, the control section 71 sets the reference element number "n" to 2 (step S111), and executes the second MTF calculation processing (step S112)

Figure 9C:
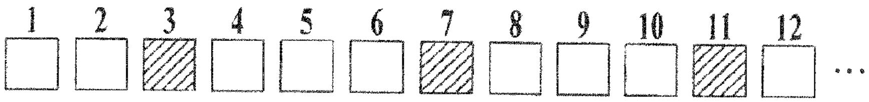
FIG. 9C a diagram showing the lighting pattern example (the example of light emitting elements adjacent to the other edge portion of each group being sequentially lit) of the canonical processing of 1 (ON)-3 (OFF)

In the processing performed in steps S109-S112, the light emitting elements adjacent to the other edge portion of each group (for example, the light emitting elements of element number "n"=3, 7, 11 . . . , as shown in FIG. 9C) are sequentially lit and the light reception section 30 is moved to the position of the light emitting element to be lit, thus the maximum light amount value for the lit light emitting element is obtained, by the control section 71. Further, in the processing performed in steps S109-S112, the light reception section 30 is moved to the position of the light emitting element located at the center (for example, the light emitting elements of element number "n" 5, 9, 13 . . . ) among the three continuous light emitting elements which does not belong to the same group as the lit light emitting element, thus the minimum light amount value for the lit light emitting element is obtained. Subsequently, in the processing performed in steps S109-S112, the MTF value is calculated, based on the maximum light amount value and the minimum light amount value, thus the calculated MTF value is regarded as the MTF value of the light emitting element adjacent to the other edge portion of each group.

When the processing in step S112 has been performed, the control section 71 instructs the LPH control section 50 to set the lighting pattern to 1(ON)-3(OFF) in which the light emitting elements arranged at the other edge portion of each group are sequentially lit (step S113). The control section 71 instructs the light reception control section/drive control section 60 to move the light reception section 30 to the original point position, and sets the reference element number "n" to 0 (step S114). Subsequently, the control section 71 sets the reference element number "n" to 3 (step S115), and executes the second MTF calculation processing (step S116). Thus, the MTF measurement processing of the canonical processing in the 1(ON)-3(OFF) is terminated.

Figure 9D:
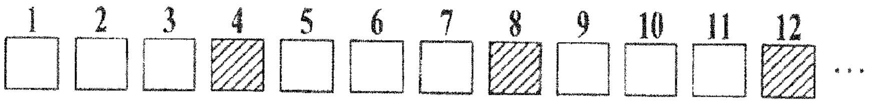
FIG. 9D is a diagram showing the lighting pattern example (the example of light emitting elements disposed on the other edge portion of each group being sequentially lit) of the canonical processing of 1 (ON)-3(OFF)
Figure 9D:
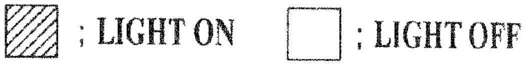

In the processing performed in steps S113-S116, the light emitting elements arranged at the other edge portion of each group (for example, the light emitting elements of element number "n"=4, 8, 12 . . . , as shown in FIG. 9D) are sequentially lit and the light reception section 30 is moved to the position of the light emitting element to be lit, thus the maximum light amount value for the lit light emitting element is obtained. Further, in the processing performed in steps S113-S116, the light reception section 30 is moved to the position of the light emitting element located at the center (for example, the light emitting elements of element number "n"= 6, 10, 14 . . . ) among the three continuous light emitting elements which belong to another group adjacent to the lit light emitting element, thus the minimum light amount value for the lit light emitting element is obtained. Subsequently, in the processing performed in steps S113-S116, the MTF value is calculated, based on the maximum light amount value and the minimum light amount value, thus the calculated MTF value is regarded as the MTF value of the light emitting element arranged at the other edge portion of each group.

Next, the MTF measurement processing of the summary processing in 1(ON)-3(OFF) is described.

In the MTF measurement processing of the summary processing in the lighting pattern of 1(ON)-3(OFF), four light emitting elements arranged continuously are regarded as one group, and the MTF value of either one of the light emitting elements in each group is calculated so as to regard the calculated MTF value as the common MTF value of the group.

In the MTF measurement processing of the summary processing in the lighting pattern of 1(ON)-3(OFF), the light emitting elements of every three elements from the first light emitting element (for example, the light emitting elements of the element number "n"=1, 5, 9 . . . ) are sequentially lit, and the maximum light amount value for the lit light emitting element is obtained. Further, the light reception section 30 is moved to the position of the light emitting element (for example, the light emitting elements of element number "n"=3, 7, 11 . . . ) located at the center of the three continuous light emitting elements in between the lit elements, and the minimum light amount value for the lit light emitting element is obtained. In the MTF measurement processing of the summary processing in the lighting pattern of 1(ON)-3(OFF), the MTF value is calculated, based on the maximum light amount value and the minimum light amount value, and the calculated MTF value is regarded as the common MTF value of each group.

Accordingly, the canonical processing is processing in which the calculation of the MTF value by sequentially lighting every three light emitting elements is repeated four times in a state where the element to be lit first differs each time, thereby the entire light emitting elements are lit to calculate the MTF value of each light emitting element. On the other hand, the summary processing is processing in which the second MTF processing is to be executed once. Thus, the number of the light emitting elements to be lit can be reduced to a quarter so as to abbreviate the measurement and calculation processing in the summary processing compared to the case of the canonical processing.

Figure 10:
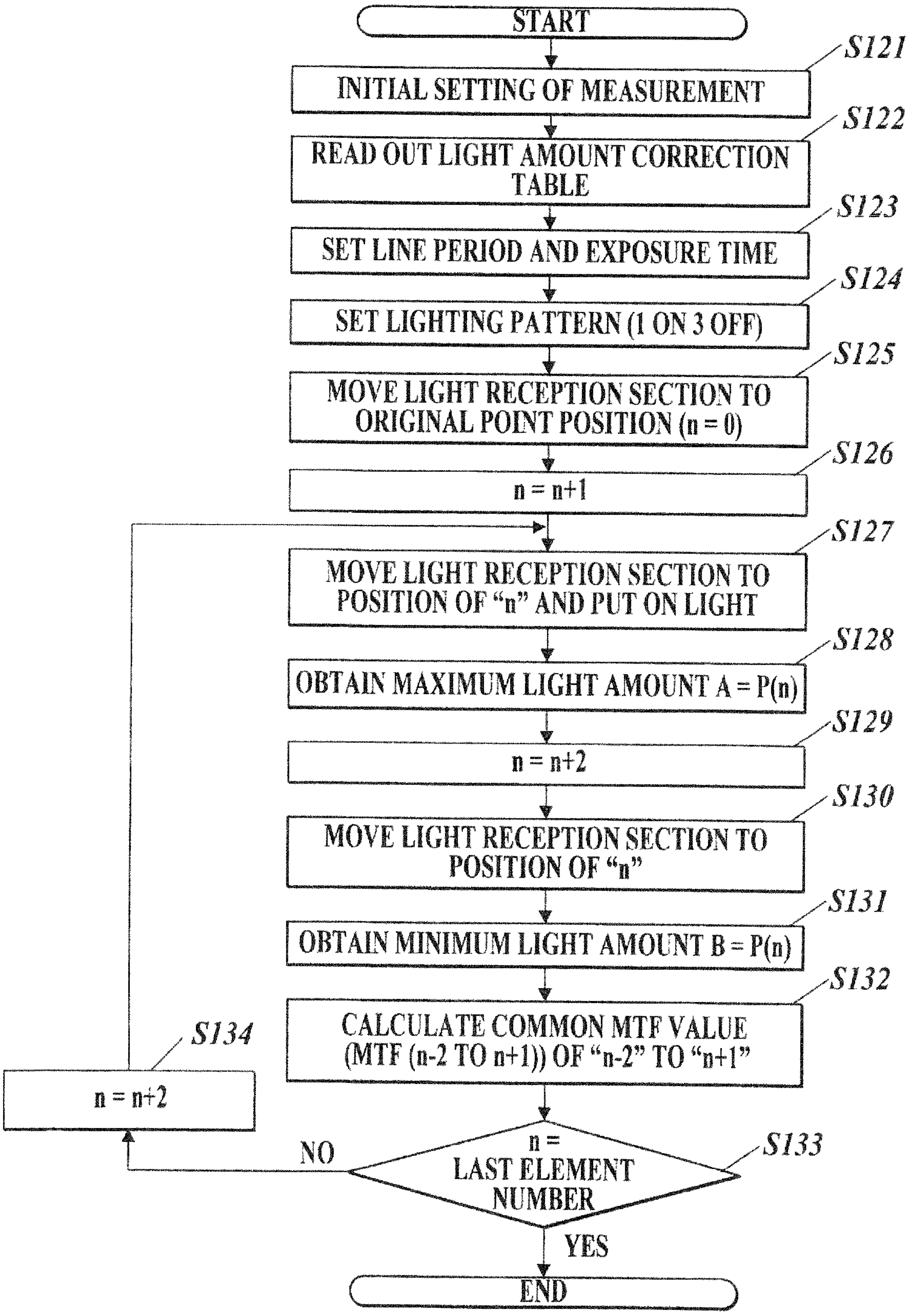
FIG. 10 is a flow chart of the MTF measurement processing of the summary processing in which the lighting pattern is 1 (ON)-3 (OFF)

FIG. 10 shows the flow chart of the MTF measurement processing in the summary processing in the lighting pattern of 1(ON)-3(OFF). Incidentally, steps S121-S131 are performed in the same manner as step S91-S101 in FIG. 8, thus the description thereof is omitted.

The control section 71 calculates the common MTF value MTF(n−2 to n+1) of the reference element numbers "n−2" to "n+1", based on the maximum light amount value A obtained in step S128 and the minimum light amount value B obtained in step S131 (step S122). The calculation formula of the MTF value in step S132 is the same as the above described formula (8).

The control section 71 judges whether the reference element number "n" is the last element number or not (step S133) When the reference element number "n" is not the last element number in step S133 (step S133; No), the reference element number "n" is added with 2 (step S134), and the processing is returned to step S127. When the reference element number "n" is the last element number in step S133 (step S133; Yes), the MTF measurement processing of the summary processing in the lighting pattern of 1(ON)-3(OFF) is terminated.

As described above, the lighting pattern of 1(ON)-3(OFF) in which every three light emitting elements are lit is employed to calculate the MTF value, thereby the characteristic data (the MTF value) for each light emitting element can be obtained according to the resolution of the LPH 10. Thus, the specification accuracy of the correction target light emitting element can be improved. Further, the MTF data can efficiently be measured even for a lengthy LPH.

Next, The MTF measurement processing in the lighting pattern of 2 (ON)-2(OFF) is described.

First, the MTF measurement processing of the canonical processing in 2 (ON)-2(OFF) is described.

In the MTF measurement processing of the canonical processing in the lighting pattern of 2 (ON)-2(OFF), four light emitting elements arranged continuously are regarded as one group, and the MTF value is calculated by the unit of two elements.

In the MTF measurement processing of the canonical processing in the lighting pattern of 2 (ON)-2(OFF), the calculation is performed by the control section 71 as follows. That it, first, the MTF value of the light emitting element arranged at one edge portion and the one adjacent thereto of each group are calculated. Subsequently, the MTF value of the element arranged at the other edge portion and the one adjacent thereto of each group are calculated.

Figure 11:
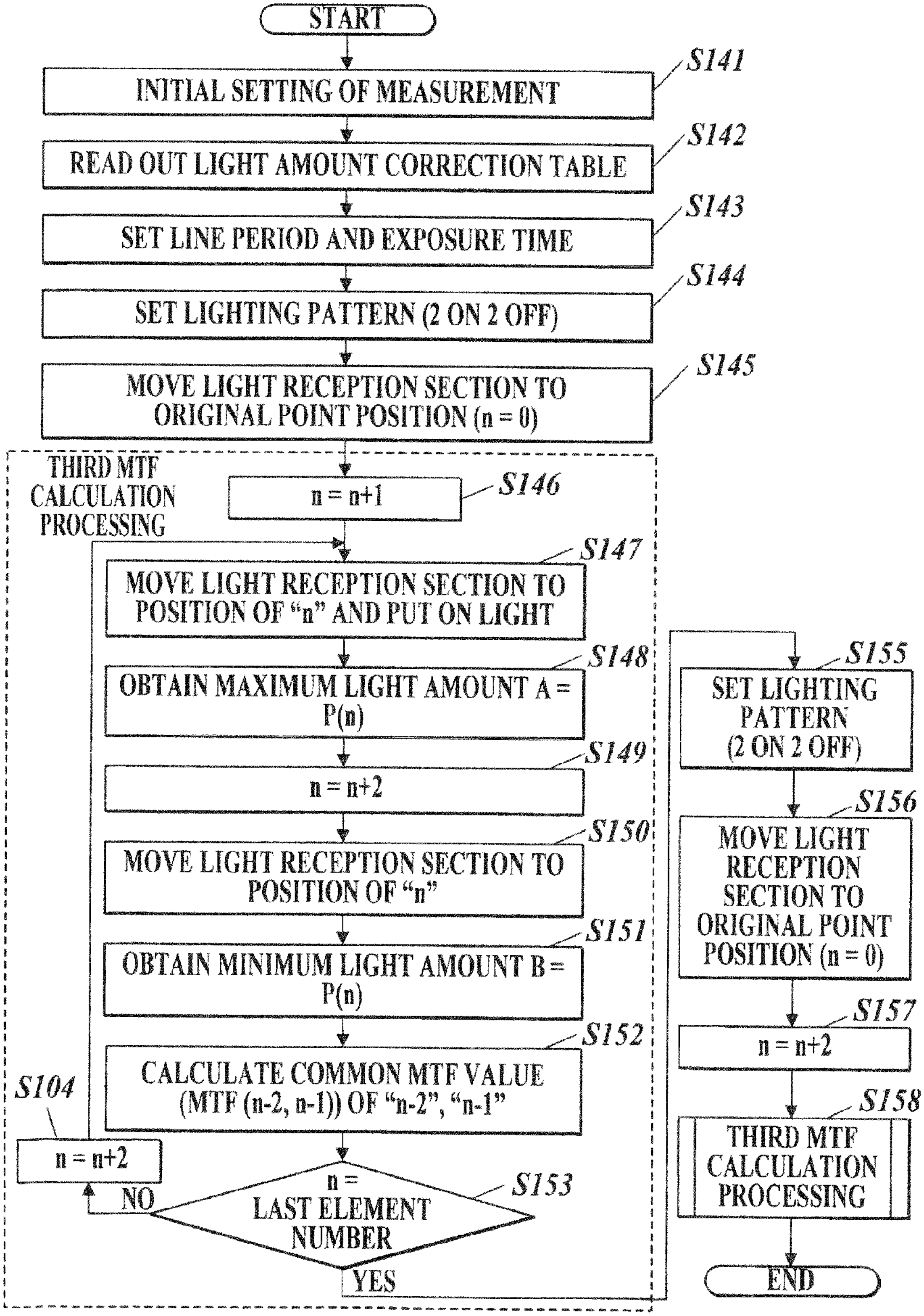
FIG. 11 is a flow chart of the MTF measurement processing of the canonical processing in which the lighting pattern is 2 (ON)-2 (OFF)
Figure 12A:
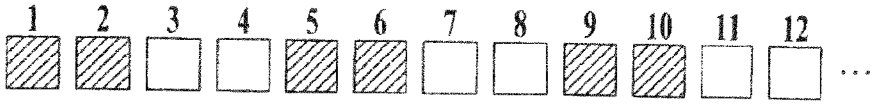
FIG. 12A is a diagram showing the lighting pattern example (an example of light emitting elements on one edge portion and the ones adjacent to one edge portion of each group being sequentially lit by a unit of 2 elements) of the canonical processing of 2 (ON)-2 (OFF)
Figure 12B:
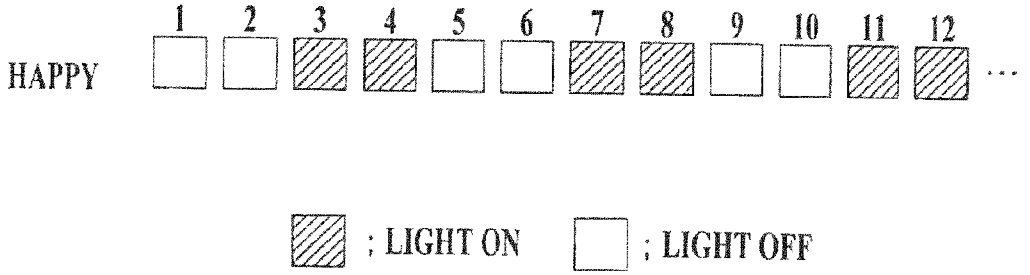
FIG. 12B is a diagram showing the lighting pattern example (an example of light emitting elements on the other edge portion and the ones adjacent to the other edge portion of each group being sequentially lit by a unit of 2 elements) of the canonical processing of 2 (ON)-2 (OFF)

FIG. 11 shows the flow chart of the MTF measurement processing in the canonical processing in the lighting pattern of 2 (ON)-2(OFF), and FIGS. 12A and 12B show the lighting pattern examples in the present processing. Incidentally, steps S141-S143 are performed in the same manner as step S61-S63 in FIG. 6, thus the description thereof is omitted.

The control section 71 instructs the LPH control section 50 to set the lighting pattern to 2 (ON)-2(OFF) in which the light emitting elements arranged at one edge portion and the ones adjacent thereto of each group are sequentially lit by the unit of two elements (step S144). The control section 71 instructs the light reception control section/drive control section 60 to move the light reception section 30 to the original point position, and sets the reference element number "n" to 0 (step S145).

The control section 71 adds 1 to the reference element number "n" (step S146), instructs the light reception control section/drive control section 60 to drive the drive section 40 so as to move the light reception section 30 to the position corresponding to the reference element number "n", and instructs the LPH control section 50 to light the light emitting element of the reference element numbers "n" and "n+1" (step S147). The control section 71 obtains the light amount measurement value P(n) in which the light amount value of the light received by the light reception section 30 is converted by the light reception control section/drive control section 60, as the common maximum light amount value A of the two lit light emitting elements (step S148).

The control section 71 adds 2 to the reference element number "n" (step S149), and instructs the light reception control section/drive control section 60 to drive the drive section 40 so as to move the light reception section 30 to the position corresponding to the reference element number "n" (step S150). The control section 71 obtains the light amount measurement value P(n) in which the light amount value of the light received by the light reception section 30 is converted by the light reception control section/drive control section 60, as the common minimum light amount value B of the two light emitting elements lit in step S147 (step S151).

The control section 71 calculates the common MTF value MTF(n−2, n−1) of the reference element numbers "n−2" and "n−1", based on the maximum light amount value A obtained in step S148 and the minimum light amount value B obtained in step S151 (step S152). The calculation formula of the MTF value in step S152 is the same as the above described formula (8).

The control section 71 judges whether the reference element number "n" is the last element number or not (step S153). When the reference element number "n" is not the last element number in step S103 (step S153; No), the reference element number "n" is added with 2 (step S154), and the processing is returned to step S147. The processing performed in steps S146-154 is hereinbelow referred to as the third MTF calculation processing.

In the processing performed in steps S144-S154, the light emitting elements arranged at one edge portion and the ones adjacent thereto of each group (for example, the light emitting elements of element number "n"=1, 2, 5, 6, 9, 10, . . . , as shown in FIG. 12A) are sequentially lit by the unit of two elements, and the light reception section 30 is moved to the position of either of the light emitting elements to be lit, thus the maximum light amount value for the two lit light emitting elements is obtained. Further, in the processing performed in steps S144-S154, the light reception section 30 is moved to the position of either of the light emitting elements which are not lit in each group (for example, the light emitting elements of element number "n"=3, 4, 7, 8, 11, 12 . . . ), thus the minimum light amount value for the lit light emitting elements is obtained. Subsequently, in the processing performed in steps S144-S154, the MTF value of the lit light emitting element is calculated, based on the maximum light amount value and the minimum light amount value, thus the calculated MTF value is regarded as the common MTF value of the light emitting element at one edge portion and the one adjacent thereto of each group.

When the reference element number "n" is the last element number (step S153; Yes), the control section 71 instructs the LPH control section 50 to set the lighting pattern to 2(ON)-2(OFF) in which the light emitting elements arranged at the other edge portion and the ones adjacent thereto of each group are sequentially lit by the unit of two elements (step S155). The control section 71 instructs the light reception control section/drive control section 60 to move the light reception section 30 to the original point position, and sets the reference element number "n" to 0 (step S156). Subsequently, the control section 71 adds 2 to the reference element number "n" (step S157), and executes the third MTF calculation processing (step S158)

In the processing performed in steps S155-S158, the light emitting elements arranged at the other edge portion and the ones adjacent thereto of each group (for example, the light emitting elements of element number "n"=3, 4, 7, 8, 11, 12, . . . , as shown in FIG. 12B) are sequentially lit by the unit of two elements, and the light reception section 30 is moved to the position of either of the light emitting elements to be lit, thus the maximum light amount value for the two lit light emitting elements is obtained. Further, in the processing performed in steps S155-S158, the light reception section 30 is moved to the position of either of the light emitting elements having the lighting order subsequent to each of the lit light emitting element by two elements (for example, the light emitting elements of element number "n"=5, 6, 9, 10 . . . , as shown in FIG. 12B), thus the minimum light amount value for the lit light emitting elements is obtained. Subsequently, in the processing performed in steps S155-S158, the MTF value is calculated, based on the maximum light amount value and the minimum light amount value, thus the calculated MTF value is regarded as the common MTF value of the light emitting element arranged at the other edge portion and the one adjacent thereto of each group.

Next, the MTF measurement processing of the summary processing in 2(ON)-2(OFF) is described.

In the MTF measurement processing of the summary processing in the lighting pattern of 2(ON)-2(OFF), four light emitting elements arranged continuously are regarded as one group, and the MTF value of the two light emitting elements arranged continuously in each group is calculated so as to regard the calculated MTF value as the common MTF value of the group.

In the MTF measurement processing of the summary processing in the lighting pattern of 2(ON)-2(OFF), the light emitting elements of every two elements from the first light emitting element (for example, the light emitting elements of the element number "n"=1, 2, 5, 6, 9, 10 . . . ) are sequentially lit by the unit of two elements, and the maximum light amount value for the two lit light emitting elements is obtained. Further, the light reception section 30 is moved to the position of either of the continuous light emitting elements which are not lit (for example, the light emitting elements of element number "n"=3, 4, 7, 8, 11, 12, . . . ), and the minimum light amount value for the two lit light emitting elements is obtained. In the MTF measurement processing of the summary processing in the lighting pattern of 2(ON)-2(OFF), the MTF value is calculated, based on the maximum light amount value and the minimum light amount value, and the calculated MTF value is regarded as the common MTF value of each group.

Accordingly, the canonical processing is processing in which the calculation of the MTF value by sequentially lighting every two light emitting elements by the unit of two elements is repeated twice in a state where the element to be lit first differs each time, thereby the entire light emitting elements are lit to calculate the common MTF value for every two elements. On the other hand, the summary processing is processing in which the third MTF processing is to be executed once. Thus, the number of the light emitting elements to be lit can be reduced to half so as to abbreviate the measurement and calculation processing in the summary processing compared to the case of the canonical processing.

Figure 13:
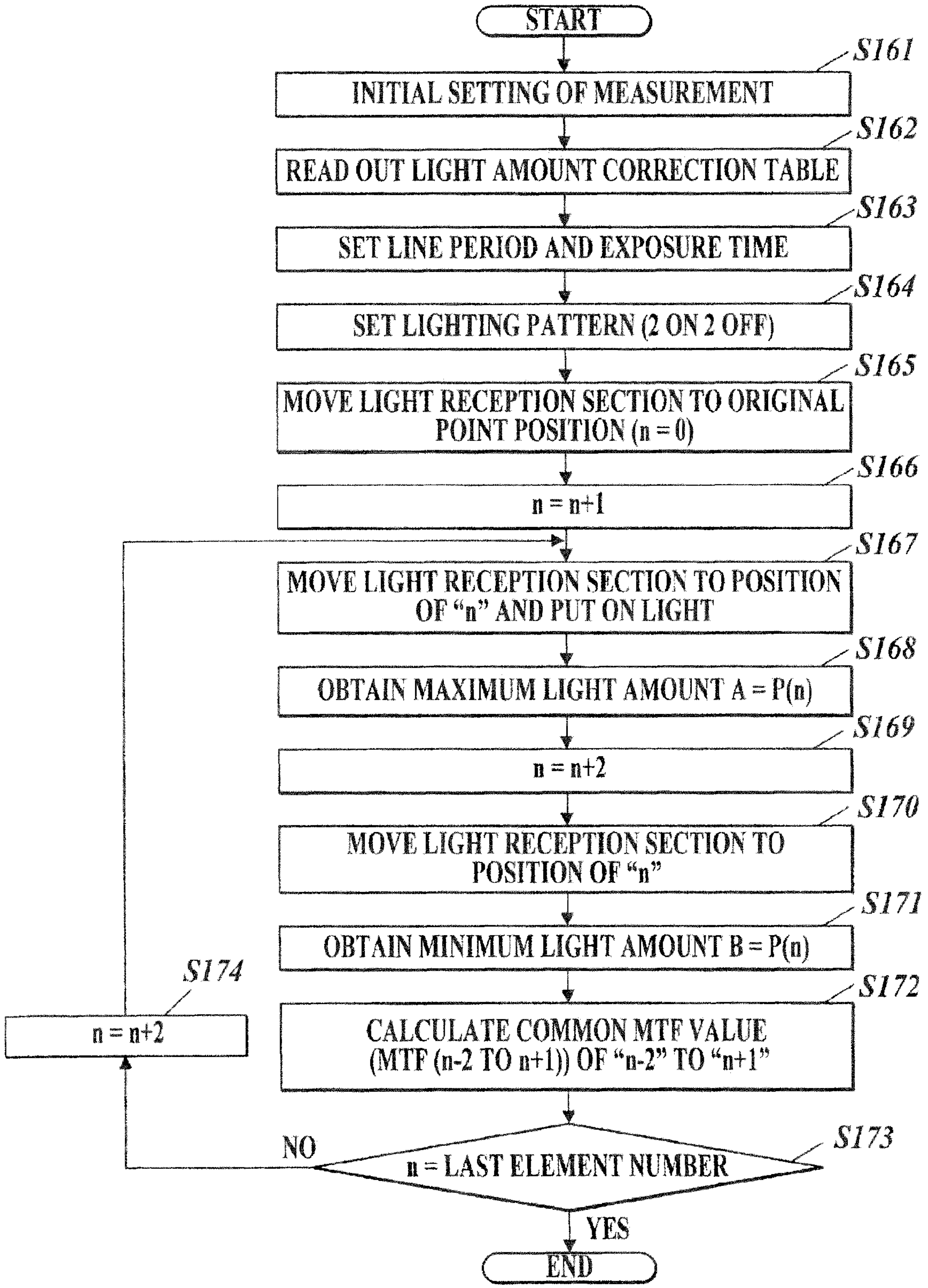
FIG. 13 is a flow chart of the MTF measurement processing of the summary processing in which the lighting pattern is 2 (ON)-2 (OFF)

FIG. 13 shows the flow chart of the MTF measurement processing in the summary processing in the lighting pattern of 2(ON)-2(OFF) Incidentally, steps S161-S171 are performed in the same manner as step S141-S151 in FIG. 11, thus the description thereof is omitted.

The control section 71 calculates the common MTF value MTF(n−2 to n+1) of the reference element numbers "n−2" to "n+1" based on the maximum light amount value A obtained in step S168 and the minimum light amount value B obtained in step S171 (step S172). The calculation formula of the MTF value in step S172 is the same as the above described formula (8).

The control section 71 judges whether the reference element number "n" is the last element number or not (step S173). When the reference element number "n" is not the last element number in step S173 (step S173; No), the reference element number "n" is added with 2 (step S174), and the processing is returned to step S167. When the reference element number "n" is the last element number (step S173; Yes), the MTF measurement processing of the summary processing in the lighting pattern of 2(ON)-2(OFF) is terminated.

As described above, the lighting pattern of 2 (ON)-2(OFF) in which every two light emitting elements are lit is employed to calculate the MTF value, thereby the common characteristic data (the MTF value) of two elements can be obtained. Thus, this MTF value can be approximated to characteristic data (MTF value) of the LPH having the resolution of ½, thereby may be useful in a case of the LPH which also forms images with resolution of ½.

Next, the processing result screen displayed in the display section 73 in step S8 is described.

Figure 14:
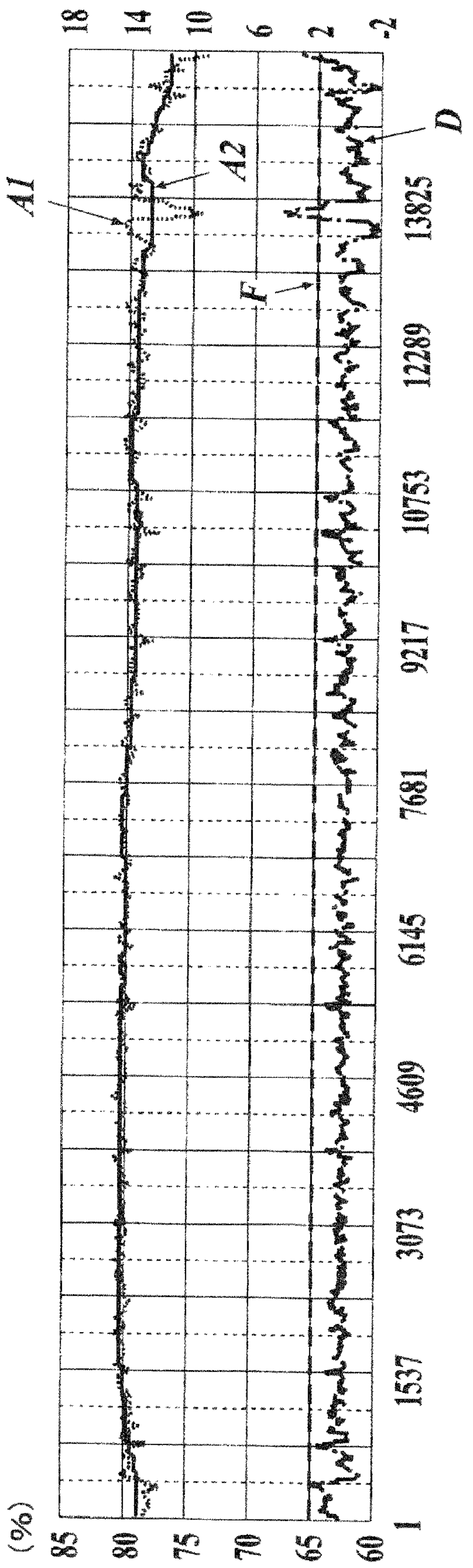
FIG. 14 is a diagram showing an example of a processing result screen.

FIG. 14 shows an example of the processing result screen.

As shown in FIG. 14, the processing result screen shows a first moving average line A1 in which the first moving average value of each light emitting element is graphed out; a second moving average line A2 in which the second moving average value of each light emitting element is graphed out; a difference value line D in which the difference value of each light emitting element is graphed out; and a threshold line F indicting the threshold value.

As shown in FIG. 14, the processing result screen which shows the processing result of the LPH evaluation processing is displayed in the display section 73. Thus, the light emitting elements corresponding to the element numbers which is the difference value of the portion not lower than the threshold value line F, among the difference value line D, can be specified as the correction target light emitting elements.

The threshold value line F shown in FIG. 14 shows the case of 2.0, and it is preferable that the threshold value line F ranges from not less than 1.6 and not more than 2.0. This threshold value is a value obtained based on a screen validation result and a difference value validation result. The screen validation result is obtained by obtaining the difference value of each light emitting element for a plurality of LPH to form an image, and the position of the noise lines being generated in the image formed on a sheet. The difference value validation result is a validation result of the shape of the image validation result and the difference value line. Hereinbelow, the threshold value is described.

First, the image validation is described.

The image validation is to form a dot screen image of 175 lines, screen angle 15°, and a middle tone with a density of 10%-100% by a unit of 10% density on a sheet, for each of the 50 LPHs with the resolution of 1200 dpi, and to visually observe the existence and the non-existence of the noise lines in the image formed by each LPH. By this image validation result, the noise lines were observed in the images formed by 5 of the LPHs.

FIG. 15 shows the table of the image validation result of the LPH where the noise lines were observed. Here, the symbols "○" and "×" shown in FIG. 15 respectively represent the non-existence and the existence of the noise lines.

The table of the image validation result shown in FIG. 15 shows the existence and the nonexistence of the noise lines for each element segment in each LPH where the noise lines were observed (sample number 10, 11, 26, 37, 47).

The element segment is a segment obtained by dividing the 15360 light emitting elements provided in the LPH with the resolution of 1200 dpi by 40 with 384 units. Each segment is set with an identification number (element segment number).

As shown in FIG. 15, the noise lines were observed in the element segment number 36 of the LPH having the sample number 10, the element segment number 38 of the LPH having the sample number 11, the element segment number 16 of the LPH having the sample number 26, the element segment number 16 of the LPH having the sample number 37, and the element segment number 36 of the LPH having the sample number 47, respectively Next, in the 5 LPHs in which the noise lines were observed (sample number 10, 11, 26, 37, 47), the maximum value of the difference value is obtained for each element segment, thus the difference value validation is performed in which the existence and the nonexistence of the element segment where the obtained maximum value of the difference value is higher than a predetermined threshold value is verified. Further, the comparison with the image validation result is performed.

Incidentally, the comparison region with the image validation result is set to be the element segment 3-38.

When the second moving average interval is 768 elements, this second moving average interval corresponds to two element segments. Accordingly, the second moving average value of the element segment number 1 and 40 cannot be obtained directly. Further, the optical characteristics of the imaging lens disposed at an edge portion in the main scanning direction of the lens array is worse than that of the imaging lens disposed in the vicinity of the center portion. Further, the element segments 3-38 which excludes the element segments 1, 2, 39, 40, correspond to the length of a sheet with "A3" size, and the main image forming is executed in the region of the element segment 3-38. This is why the comparison region is set to be the element segment 3-38. In a case where the size exceeds the "A3" size, the edge portion of the target LPH is to be two element intervals.

When the maximum value of the difference value is calculated, the difference values are obtained for the combination patterns of 5 moving average intervals, in the case where the first moving average interval is 52, 78, 104 elements for the second moving average interval of 768 elements, and in the case where the first moving average interval is 52, 78 elements for the second moving average interval of 384 elements. FIGS. 16-20 show the tables of the difference value validation results of each LPH for the combination patterns of each moving average interval.

The difference value validation result shown in FIG. 16 is an example of the combination pattern of the moving average interval, when the threshold value is 2.04, and the first moving average interval is 52 elements for the second moving average interval of 768 elements. As shown in FIG. 16, the maximum value of the difference value was not less than the threshold value in the case of the element segment number 1, 36 of the LPH with the sample number 10; the element segment number 38 of the LPH with the sample number 11; the element segment number 16 of the LPH with the sample number 26; the element segment number 16 of the LPH with the sample number 37; and the element segment number 36, 39 of the LPH with the sample number 47, respectively.

When the threshold value is 2.04, the element segment at which the maximum value of the difference value is not less than the threshold value was the same as the element segment in the image validation result at all LPH.

The difference value validation result shown in FIG. 17 is an example of the combination pattern of the moving average interval, when the threshold value is 1.74, and the first moving average interval is 78 elements for the second moving average interval of 768 elements. As shown in FIG. 17, the maximum value of the difference value was not less than the threshold value in the case of the element segment number 1, 36, 39 of the LPH with the sample number 10; the element segment number 38 of the LPH with the sample number 11; the element segment number 16 of the LPH with the sample number 26; the element segment number 16 of the LPH with the sample number 37; and the element segment number 36, 39, 40 of the LPH with the sample number 47, respectively.

When the threshold value is 1.74, the element segment at which the maximum value of the difference value is not less than the threshold value was the same as the element segment in the image validation result at all LPH.

The difference value validation result shown in FIG. 18 is an example of the combination pattern of the moving average interval, when the threshold value is 1.53, and the first moving average interval is 104 elements for the second moving average interval of 768 elements. As shown in FIG. 18, the maximum value of the difference value was not less than the threshold value in the case of the element segment number 1, 36 of the LPH with the sample number 10; the element segment number 38 of the LPH with the sample number 11; the element segment number 16 of the LPH with the sample number 26; the element segment number 16, 17 of the LPH with the sample number 37; and the element segment number 36, 39, 40 of the LPH with the sample number 47, respectively.

When the threshold value is 1.53, the element segment at which the maximum value of the difference value is not less than the threshold value did not match the element segment in the image validation result, in the LPH with the sample number 10, resulting in over-detection.

The difference value validation result shown in FIG. 19 is an example of the combination pattern of the moving average interval, when the threshold value is 1.50, and the first moving average interval is 52 elements for the second moving average interval of 384 elements. As shown in FIG. 19, the maximum value of the difference value was not less than the threshold value in the case of the element segment number 1, 27, 28, 36 of the LPH with the sample number 10; the element segment number 38 of the LPH with the sample number 11; the element segment number 16 of the LPH with the sample number 26; the element segment number 16 of the LPH with the sample number 37; and the element segment number 11, 36, 39 of the LPH with the sample number 47, respectively.

When the threshold value is 1.50, the element segment at which the maximum value of the difference value is not less than the threshold value did not match the element segment in the image validation result, in the LPH with the sample numbers 10, 47, resulting in over-detection.

The difference value validation result shown in FIG. 20 is an example of the combination pattern of the moving average interval, when the threshold value is 1.60, and the first moving average interval is 76 elements for the second moving average interval of 384 elements. As shown in FIG. 20, the maximum value of the difference value was not less than the threshold value in the case of the element segment number 1, 36 of the LPH with the sample number 10; the element segment number 38 of the LPH with the sample number 11; the element segment number 16 of the LPH with the sample number 26; the element segment number 16 of the LPH with the sample number 37; and the element segment number 36 of the LPH with the sample number 47, respectively When the threshold value is 1.60, the element segment at which the maximum value of the difference value is not less than the threshold value was the same as the element segment in the image validation result at all LPH.

As described above, the threshold values in which the image detection result and the difference value detection result matched were 2.04, 1.74, and 1.60. Thus, it is discovered that it is preferable to set the range of the threshold value within not less than 1.6 and not more than 2.0. Accordingly, by setting the range of the threshold value within not less than 1.6 and not more than 2.0, the correction target light emitting elements which cause the generation of the noise lines can be specified.

According to the above described embodiment, the places in need of correction of the light emitting elements comprised by the LPH 10, corresponding to the generation position of the noise lines, can be previously specified by the third calculation value displayed in the display section. Further, whether an image quality issue is to be generated or not can be judged. Further, an opportunity to take measures according to the issue, before incorporating the optical writing device into the image forming apparatus can be obtained, thereby the image quality can be improved.

Particularly, when the first moving average interval is set to 52 elements which is the minimum number of elements contributing to the detection accuracy of the black noise lines generated because of the configuration of the optical section, thereby the specification accuracy of the correction target Light emitting elements can be improved. Further by setting the second moving average interval to 768 elements, the characteristic data (MTF value) of each light emitting element can be smoothed.

Further, the light emitting elements in which the difference value obtained by subtracting the first moving average value from the second moving average value is not less than the threshold value can be specified as the correction target light emitting elements. By using the threshold value of not less than 1.6 and not more than 2.0, the specification accuracy of the correction target light emitting elements can be improved.

Moreover, the present invention is not limited to the content of the above described embodiment, and can be suitably modified without departing from the scope of the invention.

According to a first aspect of the embodiment of the present invention, there is provided an evaluation device of an optical writing device, comprising:

the optical writing device having:

a light source section comprising a plurality of light emitting elements arranged in a main scanning direction; and an optical section comprising a plurality of imaging lenses to collect an irradiation light from the light emitting elements so as to form an image on an exposure side;

a light reception section to receive the light irradiated from the optical writing device;

a drive section to retain the light reception section at a position opposite to an irradiation side of the optical writing device, and to move the light reception section in the main scanning direction; and a control section to light each light emitting element of the optical writing device in a previously set lighting pattern based on a light amount which is previously set; to drive the drive section so as to move the light reception section to a position opposite to the light emitting element to be lit; to calculate characteristic data for each light emitting element based on a light amount value of the light received by the light reception section; to calculate a first calculation value for each light emitting element based on the characteristic data for each light emitting element; to calculate a second calculation value different from the first calculation value for each light emitting element based on the characteristic data for each light emitting element; to calculate a third calculation value based on the first calculation value and the second calculation value for each light emitting element; and to instruct the display section to display the third calculation value.

According to a second aspect of the embodiment of the present invention, there is provided an evaluation method of an optical writing device having a light source section comprising a plurality of light emitting elements arranged in a main scanning direction; and an optical section comprising a plurality of imaging lenses to collect an irradiation light from the light emitting elements so as to form an image on an exposure side, the evaluation method comprising:

lighting each light emitting element in a previously set lighting pattern based on a light amount previously set by a control section, and moving a light reception section to a position opposite to the light emitting element to be lit;

calculating of characteristic data to calculate the characteristic data for each light emitting element based on a light amount value of a light received by the light reception section;

first calculating to calculate a first calculation value for each light emitting element based on the characteristic data for each light emitting element by the control section;

second calculating to calculate a second calculation value different from the first calculation value for each light emitting element based on the characteristic data for each light emitting element by the control section;

third calculating to calculate a third calculation value based on the first calculation value and the second calculation value for each light emitting element by the control section; and specifying of a correction target to display the third calculation value in a display section by the control section.

According to the evaluation device of the optical writing device or the evaluation method of the optical writing device, the places in need of correction of the light emitting elements comprised by the optical writing device, corresponding to the generation position of the noise lines, can be previously specified by the third calculation value displayed in the display section. Further, whether an image quality issue is to be generated or not can be judged Further, an opportunity to take measures according to the issue can be obtained, before incorporating the optical writing device into the image forming apparatus, thereby the image quality can be improved.

Preferably, the lighting pattern is the lighting pattern in which every three light emitting elements are lit.

Further, the characteristic data for each light emitting element can be obtained according to the resolution of the LPH, thus the specification accuracy of the correction target light emitting elements can be improved.

Preferably, the lighting pattern is the lighting pattern in which every two light emitting elements are lit.

Further, the common characteristic data of two elements can be obtained, thus this value can be approximated to characteristic data of the LPH having the resolution of ½.

Preferably, the first calculation value is a first moving average value for each light emitting element in a first moving average interval which is previously set.

Further, the first moving average value for each light emitting element in the first moving average interval which is previously set can be used as the first calculation value.

Preferably, the first moving average interval comprises 52 elements.

Further, the first moving average interval can be set to 52 elements which is the minimum number of elements contributing to the detection accuracy of the black noise lines generated because of the configuration of the optical section, thereby the specification accuracy of the correction target light emitting elements can be improved.

Preferably, the second calculation value is a second moving average value for each light emitting element in a second moving average interval which is previously set, the second moving average interval being larger than the first moving average interval.

Further, the second moving average value for each light emitting element in the previously set second moving average interval which is larger than the first moving average interval can be used as the second calculation value.

Preferably, the second moving average interval comprises 768 elements.

Further, the second moving average interval can be set to 768 elements, thereby the characteristic data of each light emitting element can be smoothed.

Preferably, the third calculation value is a difference value obtained by subtracting the first calculation value from the second calculation value, and wherein the control section specifies the light emitting element having the difference value which is not less than a previously set threshold value as a correction target light emitting element.

Further, the light emitting elements in which the difference value which is obtained by subtracting the first calculation value from the second calculation value is not less than the threshold value can be specified as the correction target light emitting elements.

Preferably, the threshold value is not less than 1.6 and not more than 2.0.

Further, the threshold value which is not less than 1.6 and not more than 2.0 can be used, thereby the specification accuracy of the correction target light emitting elements can be improved.

The present U.S. patent application claims a priority under the Paris Convention of Japanese patent application No. 2008-226919 filed on Sep. 4, 2008, which shall be a basis of correction of an incorrect translation.

What is claimed is:

1. An evaluation device of an optical writing device, comprising:

the optical writing device having:

a light source section comprising a plurality of light emitting elements arranged in a main scanning direction; and an optical section comprising a plurality of imaging lenses to collect an irradiation light from the light emitting elements so as to form an image on an exposure side;

a light reception section to receive the light irradiated from the optical writing device;

a drive section to retain the light reception section at a position opposite to an irradiation side of the optical writing device, and to move the light reception section in the main scanning direction; and a control section to light each light emitting element of the optical writing device in a previously set lighting pattern based on a light amount which is previously set; to drive the drive section so as to move the light reception section to a position opposite to the light emitting element to be lit; to calculate characteristic data for each light emitting element based on a light amount value of the light received by the light reception section; to calculate a first calculation value for each light emitting element based on the characteristic data for each light emitting element; to calculate a second calculation value different from the first calculation value for each light emitting element based on the characteristic data for each light emitting element; to calculate a third calculation value based on the first calculation value and the second calculation value for each light emitting element; and to instruct the display section to display the third calculation value.

2. The evaluation device of the optical writing device of claim 1, wherein the lighting pattern is the lighting pattern in which every three light emitting elements are lit.

3. The evaluation device of the optical writing device of claim 1 wherein the lighting pattern is the lighting pattern in which every two light emitting elements are lit.

4. The evaluation device of the optical writing device of claim 1, wherein the first calculation value is a first moving average value for each light emitting element in a first moving average interval which is previously set.

5. The evaluation device of the optical writing device of claim 4, wherein the first moving average interval comprises 52 elements.

6. The evaluation device of the optical writing device of claim 4, wherein the second calculation value is a second moving average value for each light emitting element in a second moving average interval which is previously set, the second moving average interval being larger than the first moving average interval.

7. The evaluation device of the optical writing device of claim 6, wherein the second moving average interval comprises 768 elements.

8. The evaluation device of the optical writing device of claim 1, wherein the third calculation value is a difference value obtained by subtracting the first calculation value from the second calculation value, and wherein the control section specifies the light emitting element having the difference value which is not less than a previously set threshold value as a correction target light emitting element.

9. The evaluation device of the optical writing device of claim 8, wherein the threshold value is not less than 1.6 and not more than 2.0.

10. An evaluation method of an optical writing device having: a light source section comprising a plurality of light emitting elements arranged in a main scanning direction; and an optical section comprising a plurality of imaging lenses to collect an irradiation light from the light emitting elements so as to form an image on an exposure side, the evaluation method comprising:

lighting each light emitting element in a previously set lighting pattern based on a light amount previously set by a control section, and moving a light reception section to a position opposite to the light emitting element to be lit;

calculating of characteristic data to calculate the characteristic data for each light emitting element based on a light amount value of a light received by the light reception section;

first calculating to calculate a first calculation value for each light emitting element based on the characteristic data for each light emitting element by the control section;

second calculating to calculate a second calculation value different from the first calculation value for each light emitting element based on the characteristic data for each light emitting element by the control section;

third calculating to calculate a third calculation value based on the first calculation value and the second calculation value for each light emitting element by the control section; and specifying of a correction target to display the third calculation value in a display section by the control section.

11. The evaluation method of the optical writing device of claim 10, wherein the lighting pattern is the lighting pattern in which every three light emitting elements are lit.

12. The evaluation method of the optical writing device of claim 10, wherein the lighting pattern is the lighting pattern in which every two light emitting elements are lit.

13. The evaluation method of the optical writing device of claim 10, wherein the first calculation value is a first moving average value for each light emitting element in a first moving average interval which is previously set.

14. The evaluation method of the optical writing device of claim 13, wherein the first moving average interval comprises 52 elements.

15. The evaluation method of the optical writing device of claim 13, wherein the second calculation value is a second moving average value for each light emitting element in a second moving average interval which is previously set, the second moving average interval being larger than the first moving average interval.

16. The evaluation method of the optical writing device of claim 15, wherein the second moving average interval comprises 768 elements.

17. The evaluation method of the optical writing device of claim 10, wherein the third calculation value is a difference value obtained by subtracting the first calculation value from the second calculation value, and wherein the control section specifies the light emitting element having the difference value which is not less than a previously set threshold value as a correction target light emitting element.

18. The evaluation method of the optical writing device of claim 17, wherein the threshold value is not less than 1.6 and not more than 2.0.

* * * * *